US012229415B2

United States Patent
Cao et al.

(10) Patent No.: US 12,229,415 B2
(45) Date of Patent: Feb. 18, 2025

(54) HOLE CHANNEL PRE-CHARGE TO ENABLE LARGE-VOLUME IN-PLACE DATA SANITIZATION OF NON-VOLATILE MEMORY

(71) Applicant: SanDisk Technologies LLC, Addison, TX (US)

(72) Inventors: Wei Cao, Fremont, CA (US); Jiacen Guo, Sunnyvale, CA (US); Xiang Yang, Santa Clara, CA (US)

(73) Assignee: SanDisk Technologies LLC, Austin, TX (US)

( * ) Notice: Subject to any disclaimer, the term of this patent is extended or adjusted under 35 U.S.C. 154(b) by 0 days.

(21) Appl. No.: 18/346,345

(22) Filed: Jul. 3, 2023

(65) Prior Publication Data
US 2024/0319888 A1    Sep. 26, 2024

Related U.S. Application Data

(60) Provisional application No. 63/492,111, filed on Mar. 24, 2023.

(51) Int. Cl.
*G06F 3/06*    (2006.01)
(52) U.S. Cl.
CPC .......... *G06F 3/0619* (2013.01); *G06F 3/0659* (2013.01); *G06F 3/0679* (2013.01)
(58) Field of Classification Search
CPC ..... G06F 3/0619; G06F 3/0679; G06F 3/0669
See application file for complete search history.

(56) References Cited

U.S. PATENT DOCUMENTS

| 7,499,319 | B2 |  | 3/2009 | Mokhlesi |  |
|---|---|---|---|---|---|
| 10,957,394 | B1 | * | 3/2021 | Chen | G11C 16/10 |
| 2009/0154252 | A1 | * | 6/2009 | Shibata | G11C 16/14 |
|  |  |  |  |  | 365/185.29 |
| 2010/0277983 | A1 | * | 11/2010 | Mokhlesi | G11C 16/16 |
|  |  |  |  |  | 365/185.17 |
| 2011/0182119 | A1 |  | 7/2011 | Strasser et al. |  |

(Continued)

OTHER PUBLICATIONS

Diesburg, Sarah, et al., "TrueErase: Per-File Secure Deletion for the Storage Data Path," ACSAC' 12, Dec. 2012, 10 pages.

(Continued)

*Primary Examiner* — Mark A Giardino, Jr.
(74) *Attorney, Agent, or Firm* — Pearl Cohen Zedek Latzer Baratz LLP

(57) ABSTRACT

In NAND memory, data sanitization allows a relatively small unit of data (e.g., less than a block) to be effectively destroyed by increasing threshold voltages of memory cells from their programmed threshold voltage to the highest threshold state. To reduce the amount of disturb on memory cells not selected for data sanitization, prior to applying a program voltage to a target word line, a hole based pre-charge operation is performed. More specifically, for NAND strings having a memory cell selected for data sanitation, prior to applying a programming pulse to the corresponding word line, a soft erase operation is performed. After biasing the memory cells and select gates of the NAND strings to a low voltage, a soft erase voltage pulse is applied to the source lines and bit line to pre-charge the NAND string channels with holes.

20 Claims, 17 Drawing Sheets

(56) References Cited

U.S. PATENT DOCUMENTS

| | | | | |
|---|---|---|---|---|
| 2013/0279256 A1* | 10/2013 | Costa | ................ | G11C 29/52 365/185.17 |
| 2014/0198567 A1 | 7/2014 | Mokhlesi | | |
| 2018/0053562 A1 | 2/2018 | Reusswig et al. | | |
| 2020/0005878 A1 | 1/2020 | Lu et al. | | |
| 2020/0310672 A1* | 10/2020 | Cariello | ................ | G11C 16/10 |
| 2021/0134378 A1 | 5/2021 | Papandreou et al. | | |
| 2023/0195328 A1* | 6/2023 | Lu | ................ | G06F 3/0679 711/103 |
| 2024/0071515 A1* | 2/2024 | Lu | ................ | G11C 16/16 |
| 2024/0185921 A1* | 6/2024 | Choi | ................ | G11C 16/3459 |

OTHER PUBLICATIONS

Jia, Shijie, et al., "NFPS: Adding undetectable secure deletion to flash translation layer," Proceedings of the 11th ACM Asia Conference on Computer and Communications Society, May 2016, 3 pages.

Lee, Jaeheung, et al., "Secure Deletion for NAND Flash File System," SAC' 08, Mar. 2008, 5 pages.

Zuolo, Lorenzo, et al., "Solid State Drives: Memory Driven Design Methodologies for optimal Performance," Proceedings of the IEEE, vol. 105, Issue 9, Sep. 2017, 19 pages.

Chen, Feng, et al., "Software Support Inside and Outside Solid State Devices for High Performance and High Efficiency," Proceedings of the IEEE, vol. 105, Issue 9, Sep. 2017, 15 pages.

Hasan, Md Mehedi, et al., "Data Recovery from "Scrubbed" NAND Flash Storage: Need for Analog Sanitization," Usenix—The Advanced Computing Systems Association, Aug. 2020, 11 pages.

Kim, Myungsuk, et al., "Evanesco: Architectural Support for Efficient Data Sanitization in Modern Flash-Based Storage Systems," ASPLOS'20, Mar. 2020, 16 pages.

Reardon, Joel, et al., "Data Node Encrypted File System: Efficient Secure Deletion for Flash Memory," Proceedings of the 21st USENIX conference on Security symposium, Aug. 2012, 16 pages.

Raquibuzzaman, Md, et al., "Instant Data Sanitization on Multi-Level-Cell NAND Flash Memory," Systor '22, Jun. 2022, 11 pages.

Chen, Bo, "HiFlash: A History Independent Flash Device," arXIV:1511.05180v1, Nov. 2015, 14 pages.

* cited by examiner

FIG. 4D
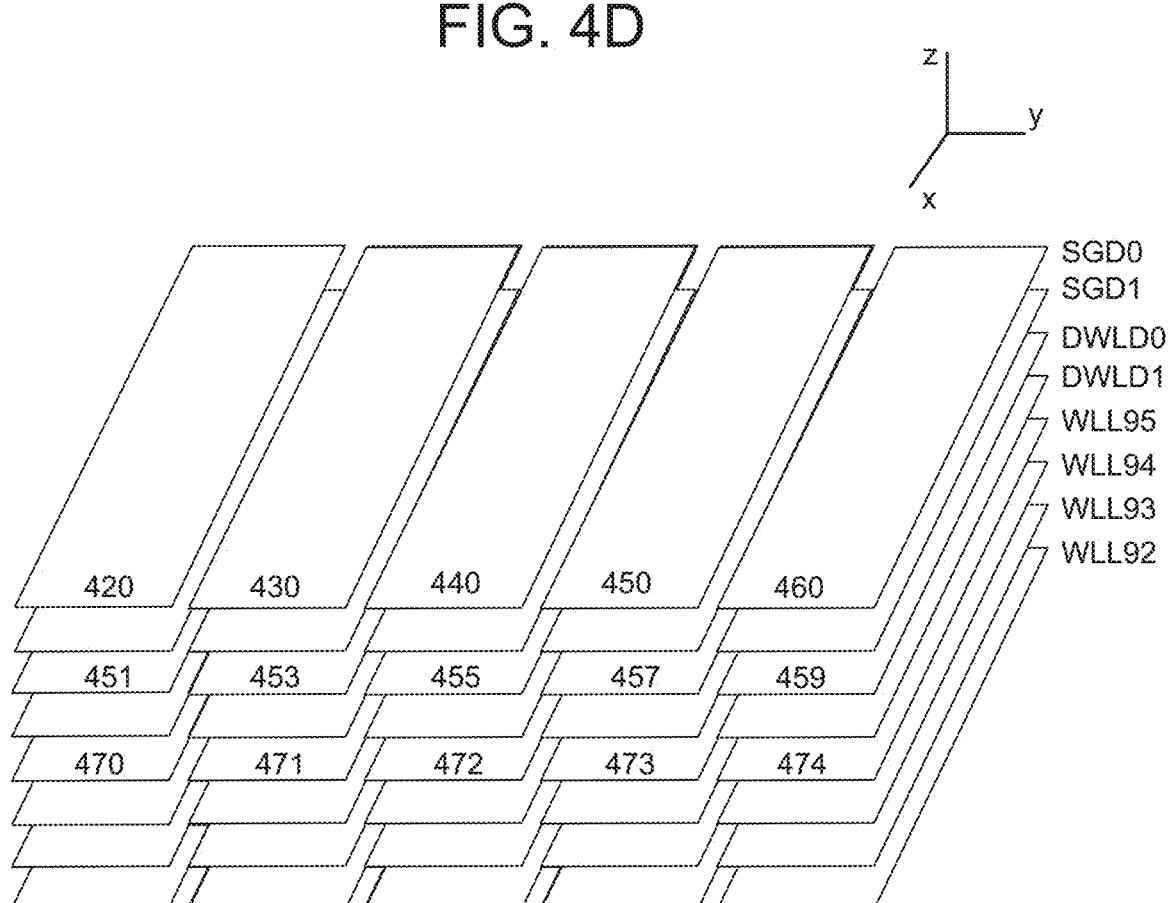
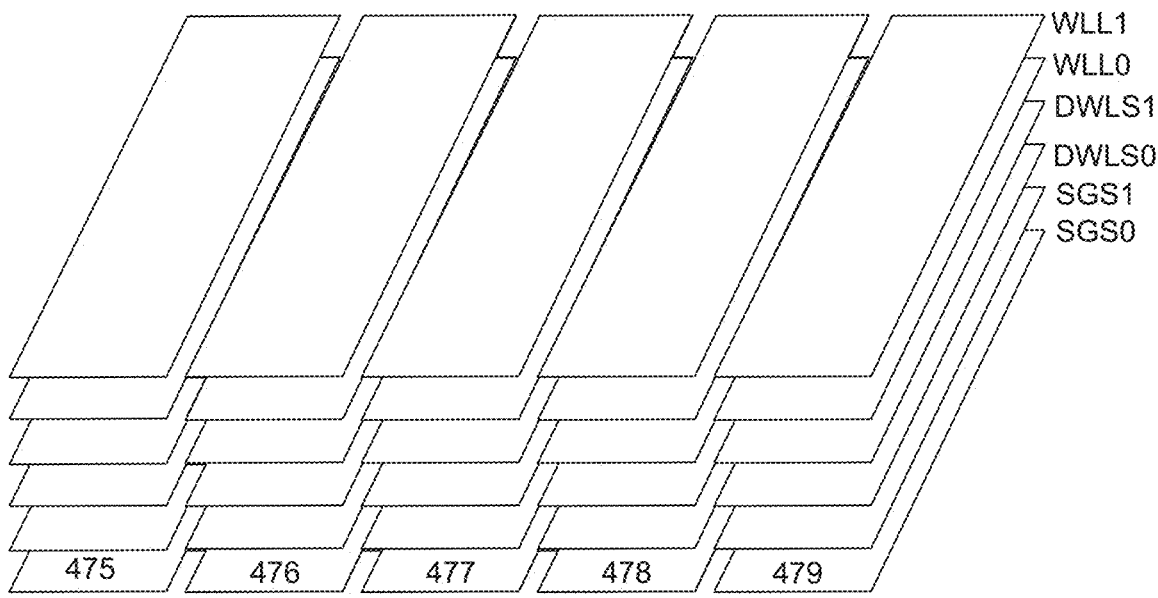

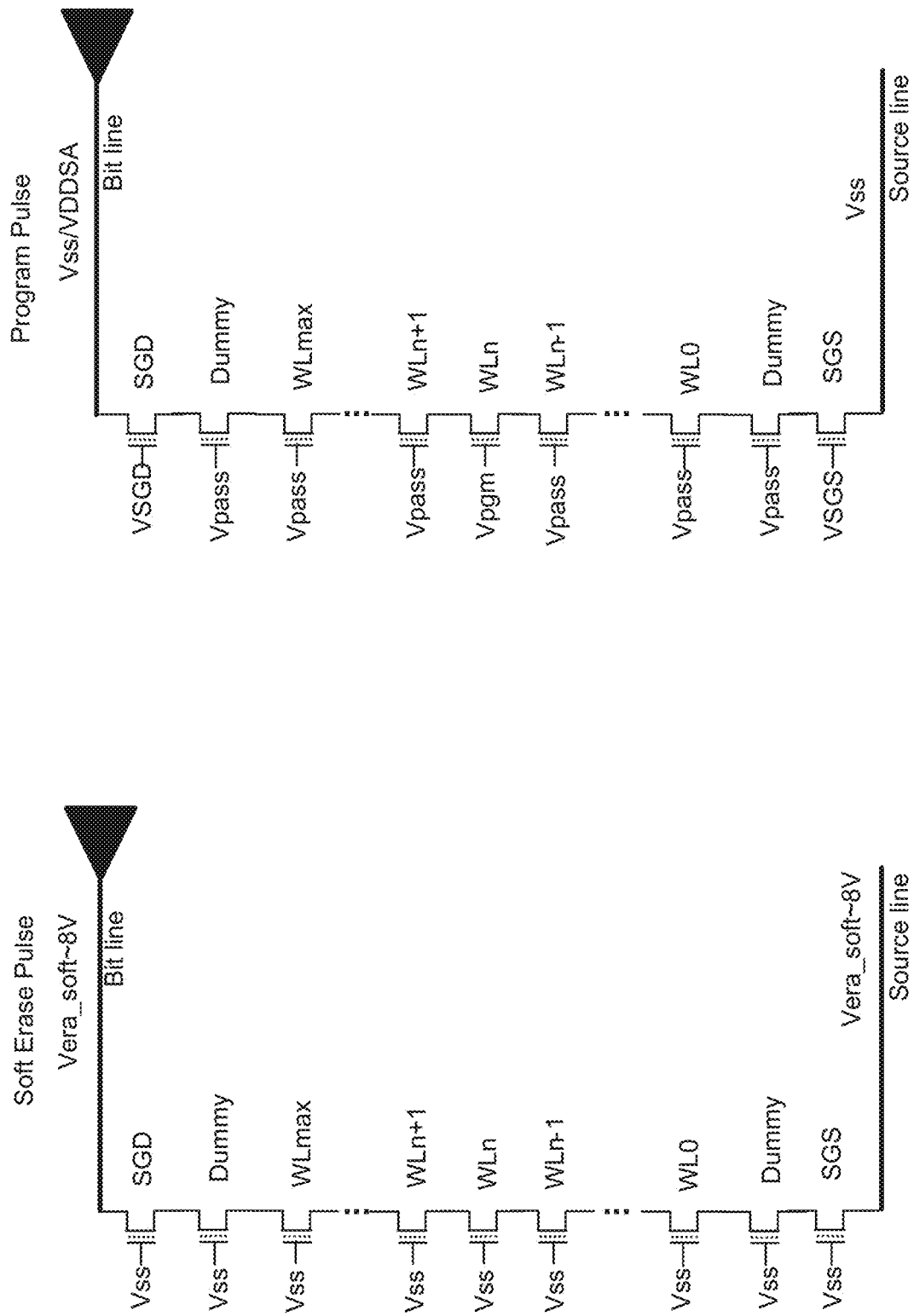

US 12,229,415 B2

HOLE CHANNEL PRE-CHARGE TO ENABLE LARGE-VOLUME IN-PLACE DATA SANITIZATION OF NON-VOLATILE MEMORY

CLAIM OF PRIORITY

The present application claims priority from U.S. Provisional Patent Application No. 63/492,111, entitled "HOLE CHANNEL PRE-CHARGE TO ENABLE LARGE-VOLUME IN-PLACE DATA SANITIZATION OF NON-VOLATILE MEMORY," by Cao et al., filed Mar. 24, 2023, incorporated by reference herein in its entirety.

BACKGROUND

Semiconductor memory is widely used in various electronic devices such as cellular telephones, digital cameras, personal digital assistants, medical electronics, mobile computing devices, servers, solid state drives, non-mobile computing devices and other devices. Semiconductor memory may comprise non-volatile memory or volatile memory. A non-volatile memory allows information to be stored and retained even when the non-volatile memory is not connected to a source of power (e.g., a battery).

One type of non-volatile memory has strings of non-volatile memory cells that have a select transistor at each end of the string. Typically, such strings are referred to as NAND strings. A NAND string may have a drain side select transistor at one end that connects the string to a bit line. A NAND string may have a source side select transistor at one end that connects the string to a source line. The non-volatile memory cells may also be referred to as non-volatile memory cell transistors, with the channels of the non-volatile memory cell transistors collectively being referred to as a NAND string channel.

BRIEF DESCRIPTION OF THE DRAWINGS

Like-numbered elements refer to common components in the different figures.

FIG. 4D depicts an alternative view of the select gate layers and word line layers of the stack 435 of FIG. 4C.

FIGS. 9, 10, and 11 respectively illustrate the biasing of a NAND string for hole based channel pre-charge, a program pulse, and an alternating series of the two during a data sanitation operation.

DETAILED DESCRIPTION

Techniques are provided for operating non-volatile memory arrays in which data may be deleted or destroyed by a sanitization operation directed to non-volatile memory cells of one or more target word lines. In NAND memory, data is erased at the block level, so data can only be deleted or destroyed at this level. Sanitization allows a relatively small unit of data (e.g., less than a block) to be efficiently destroyed by increasing threshold voltages of memory cells from their programmed threshold voltage ranges to one or more threshold voltage ranges that do not correspond to programmed data. However, increasing threshold voltage of memory cells along a target word line (e.g., by increasing the amount of charge in memory cells) on a previously programmed memory block may affect adjacent data not selected for sanitation on the different strings and/or columns of the same word line.

To reduce the amount of disturb on memory cells not selected for data sanitization, prior to applying a program voltage pulse to a target word line, a hole based pre-charge operation is performed. More specifically, prior to applying a programming pulse to the corresponding word line, a soft erase operation is performed. After biasing the memory cells and select gates of the corresponding NAND strings to a low voltage, a soft erase voltage pulse is applied to the source lines and bit line to pre-charge the NAND string channels with holes.

Figure 1:
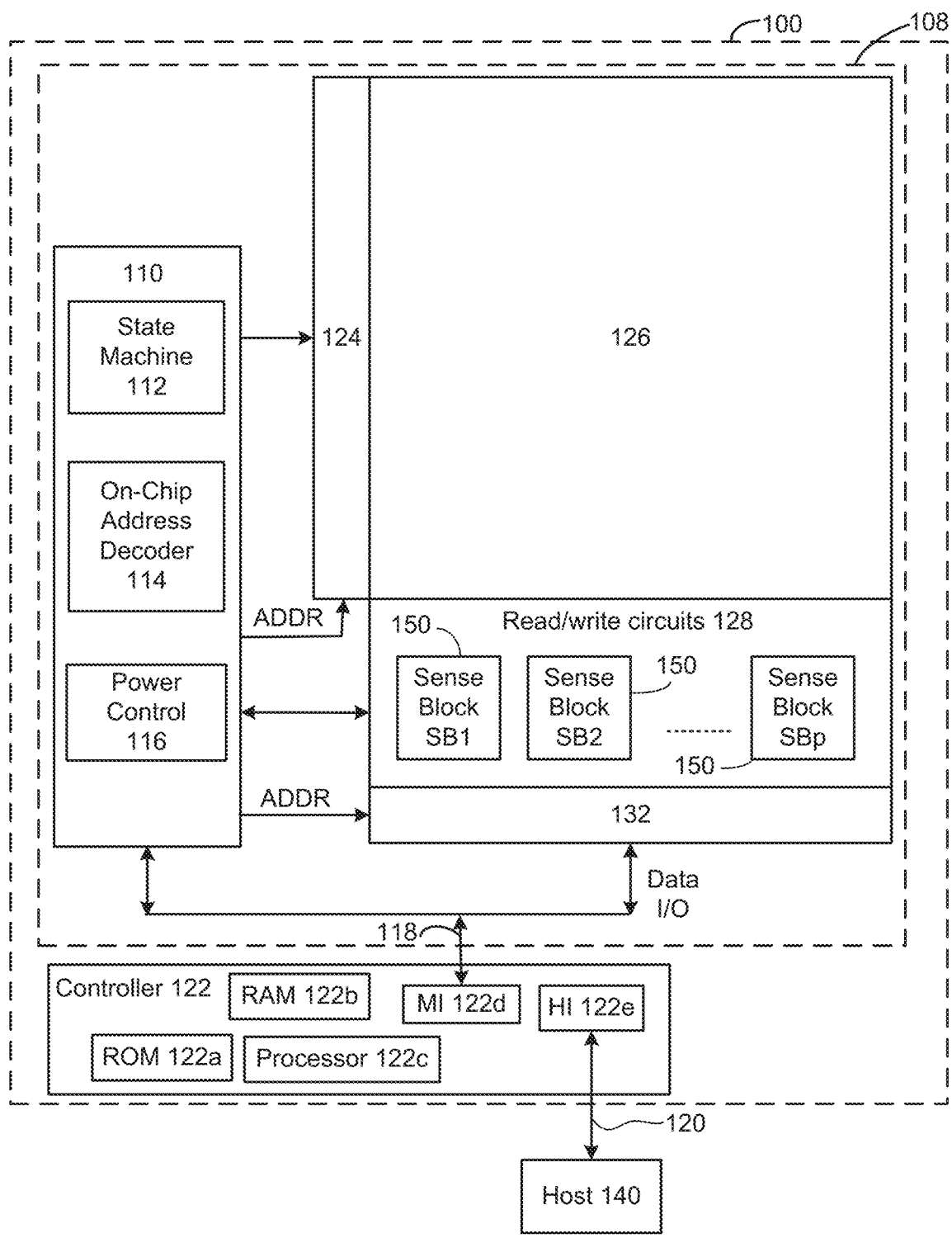
FIG. 1 is a functional block diagram of a memory device.

FIG. 1-FIG. 4D describe examples of memory systems that can be used to implement the technology proposed herein. FIG. 1 is a functional block diagram of an example memory system 100. The components depicted in FIG. 1 are electrical circuits. Memory system 100 includes one or more memory dies 108. The one or more memory dies 108 can be complete memory dies or partial memory dies. In one embodiment, each memory die 108 includes a memory structure 126, control circuit 110, and read/write circuits 128. Memory structure 126 is addressable by word lines via a row decoder 124 and by bit lines via a column decoder 132. The read/write/erase circuits 128 include multiple sense blocks 150 including SB1, SB2, . . . , SBp (sensing circuitry) and allow a page of memory cells to be read or programmed in parallel. Also, many strings of memory cells can be erased in parallel.

In some systems, a controller 122 is included in the same package (e.g., a removable storage card) as the one or more memory die 108. However, in other systems, the controller can be separated from the memory die 108. In some embodiments the controller will be on a different die than the memory die 108. In some embodiments, one controller 122 will communicate with multiple memory die 108. In other embodiments, each memory die 108 has its own controller. Commands and data are transferred between a host 140 and controller 122 via a data bus 120, and between controller 122 and the one or more memory die 108 via lines 118. In one embodiment, memory die 108 includes a set of input and/or output (I/O) pins that connect to lines 118.

Control circuit 110 cooperates with the read/write circuits 128 to perform memory operations (e.g., write, read, erase and others) on memory structure 126, and includes state machine 112, an on-chip address decoder 114, and a power control circuit 116. In one embodiment, control circuit 110 includes buffers such as registers, ROM fuses and other storage devices for storing default values such as base voltages and other parameters.

The on-chip address decoder 114 provides an address interface between addresses used by host 140 or controller 122 to the hardware address used by the decoders 124 and 132. Power control circuit 116 controls the power and voltages supplied to the word lines, bit lines, and select lines during memory operations. The power control circuit 116 includes voltage circuitry, in one embodiment. Power control circuit 116 may include charge pumps for creating voltages. The sense blocks include bit line drivers. The power control circuit 116 executes under control of the state machine 112, in one embodiment.

State machine 112 and/or controller 122 (or equivalently functioned circuits), in combination with all or a subset of the other circuits depicted in FIG. 1, can be considered a control circuit that performs various functions described herein. The control circuit can include hardware only or a combination of hardware and software (including firmware). For example, a controller programmed by firmware to perform the functions described herein is one example of a control circuit. A control circuit can include a processor, PGA (Programmable Gate Array, FPGA (Field Programmable Gate Array), ASIC (Application Specific Integrated Circuit), integrated circuit or other type of circuit.

The (on-chip or off-chip) controller 122 (which in one embodiment is an electrical circuit) may comprise one or more processors 122c, ROM 122a, RAM 122b, a memory interface (MI) 122d and a host interface (HI) 122e, all of which are interconnected. The storage devices (ROM 122a, RAM 122b) store code (software) such as a set of instructions (including firmware), and one or more processors 122c is/are operable to execute the set of instructions to provide the functionality described herein. Alternatively, or additionally, one or more processors 122c can access code from a storage device in the memory structure, such as a reserved area of memory cells connected to one or more word lines. RAM 122b can be to store data for controller 122, including caching program data (discussed below). Memory interface 122d, in communication with ROM 122a, RAM 122b and processor 122c, is an electrical circuit that provides an electrical interface between controller 122 and one or more memory die 108. For example, memory interface 122d can change the format or timing of signals, provide a buffer, isolate from surges, latch I/O, etc. One or more processors 122c can issue commands to control circuit 110 (or another component of memory die 108) via Memory Interface 122d. Host interface 122e provides an electrical interface with host 140 data bus 120 in order to receive commands, addresses and/or data from host 140 to provide data and/or status to host 140.

In one embodiment, memory structure 126 comprises a three-dimensional memory array of non-volatile memory cells in which multiple memory levels are formed above a single substrate, such as a wafer. The memory structure may comprise any type of non-volatile memory that are monolithically formed in one or more physical levels of arrays of memory cells having an active area disposed above a silicon (or other type of) substrate. In one example, the non-volatile memory cells comprise vertical NAND strings with charge-trapping material.

In another embodiment, memory structure 126 comprises a two-dimensional memory array of non-volatile memory cells. In one example, the non-volatile memory cells are NAND flash memory cells utilizing floating gates. Other types of memory cells (e.g., NOR-type flash memory) can also be used. The exact type of memory array architecture or memory cell included in memory structure 126 is not limited to the examples above.

Figure 2A:
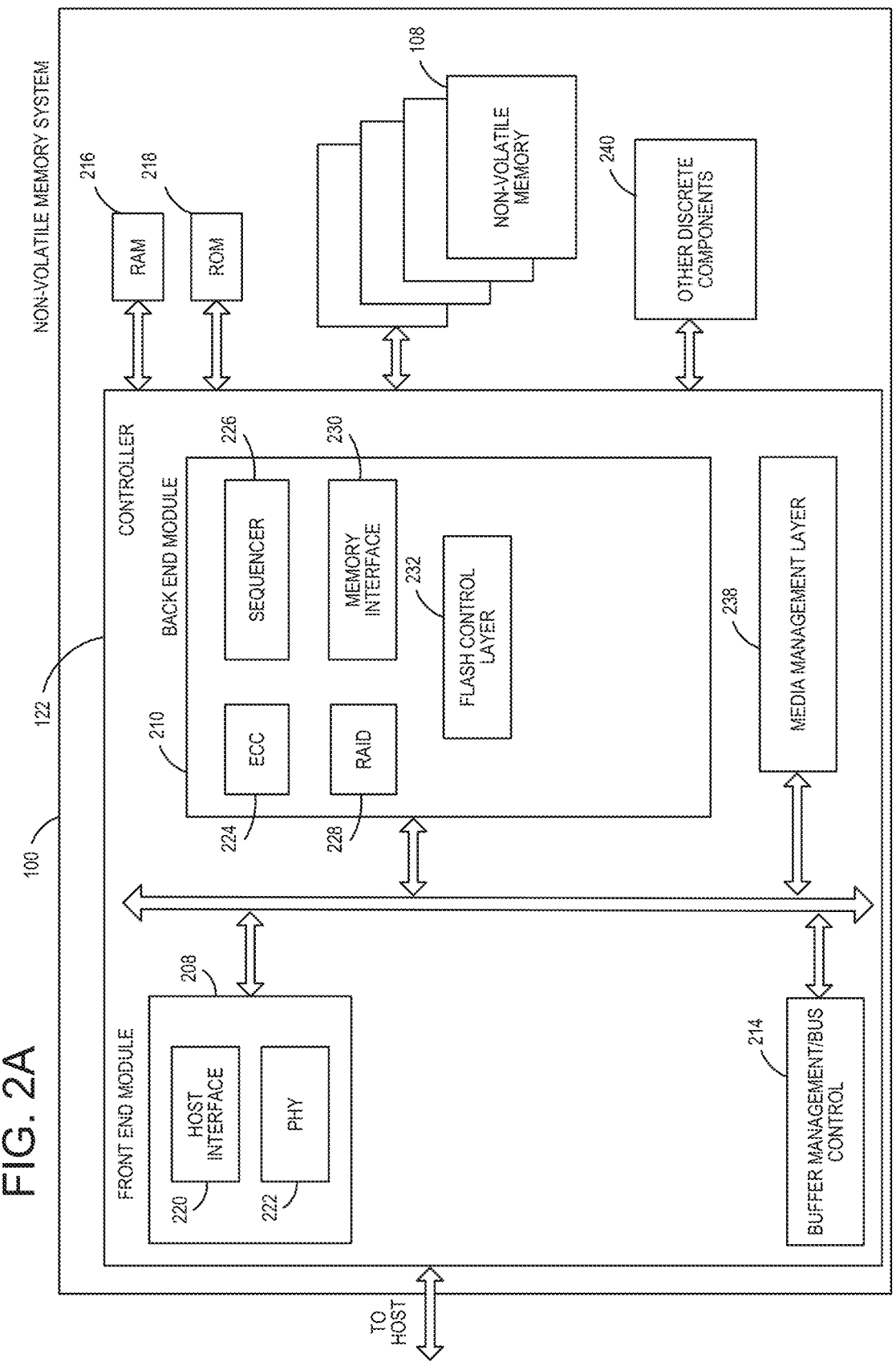
FIGS. 2A-B are block diagrams depicting embodiments of a memory system.

FIG. 2A is a block diagram of example memory system 100, depicting more details of one embodiment of controller 122. The controller in FIG. 2A is a flash memory controller but note that the non-volatile memory die 108 is not limited to flash. Thus, the controller 122 is not limited to the example of a flash memory controller. As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare memory cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address). The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between controller 122 and non-volatile memory die 108 may be any suitable flash interface, such as Toggle Mode 200, 400, or 800. In one embodiment, memory system 100 may be a card-based system, such as a secure digital (SD) or a micro secure digital (micro-SD) card. In an alternate embodiment, memory system 100 may be part of an embedded memory system. For example, the flash memory may be embedded within the host. In other examples, memory system 100 can be in the form of a solid state drive (SSD).

In some embodiments, non-volatile memory system 100 includes a single channel between controller 122 and non-volatile memory die 108, the subject matter described herein is not limited to having a single memory channel. For example, in some memory system architectures, 2, 4, 8 or more channels may exist between the controller and the memory die, depending on controller capabilities. In any of the embodiments described herein, more than a single channel may exist between the controller and the memory die, even if a single channel is shown in the drawings.

As depicted in FIG. 2A, controller 122 includes a front end module 208 that interfaces with a host, a back end module 210 that interfaces with the one or more non-volatile memory die 108, and various other modules that perform functions which will now be described in detail.

The components of controller 122 depicted in FIG. 2A may take the form of a packaged functional hardware unit (e.g., an electrical circuit) designed for use with other components, a portion of a program code (e.g., software or firmware) executable by a (micro) processor or processing circuitry that usually performs a particular function of related functions, or a self-contained hardware or software component that interfaces with a larger system, for example. For example, each module may include an application specific integrated circuit (ASIC), a Field Programmable Gate Array (FPGA), a circuit, a digital logic circuit, an analog circuit, a combination of discrete circuits, gates, or any other type of hardware or combination thereof. Alternatively, or in addition, each module may include software stored in a processor readable device (e.g., memory) to program a processor for controller 122 to perform the functions described herein. The architecture depicted in FIG. 2A is one example implementation that may (or may not) use the components of controller 122 depicted in FIG. 1 (i.e., RAM, ROM, processor, interface).

Referring again to modules of the controller 122, a buffer manager/bus control 214 manages buffers in random access memory (RAM) 216 and controls the internal bus arbitration of controller 122. A read only memory (ROM) 218 stores system boot code. Although illustrated in FIG. 2A as located separately from the controller 122, in other embodiments one or both of the RAM 216 and ROM 218 may be located within the controller. In yet other embodiments, portions of RAM and ROM may be located both within the controller 122 and outside the controller. Further, in some implementations, the controller 122, RAM 216, and ROM 218 may be located on separate semiconductor die.

Front end module 208 includes a host interface 220 and a physical layer interface (PHY) 222 that provide the electrical interface with the host or next level storage controller. The choice of the type of host interface 220 can depend on the type of memory being used. Examples of host interfaces 220 include, but are not limited to, SATA, SATA Express, SAS, Fibre Channel, USB, PCIe, and NVMe. The host interface 220 typically facilitates transfer for data, control signals, and timing signals.

Back end module 210 includes an error correction code (ECC) engine 224 that encodes the data bytes received from the host and decodes and error corrects the data bytes read from the non-volatile memory. A command sequencer 226 generates command sequences, such as program and erase command sequences, to be transmitted to non-volatile memory die 108. A RAID (Redundant Array of Independent Dies) module 228 manages generation of RAID parity and recovery of failed data. The RAID parity may be used as an additional level of integrity protection for the data being written into the non-volatile memory system 100. In some cases, the RAID module 228 may be a part of the ECC engine 224. Note that the RAID parity may be added as an extra die or dies as implied by the common name, but it may also be added within the existing die, e.g., as an extra plane, or extra block, or extra WLs within a block. A memory interface 230 provides the command sequences to non-volatile memory die 108 and receives status information from non-volatile memory die 108. In one embodiment, memory interface 230 may be a double data rate (DDR) interface, such as a Toggle Mode 200, 400, or 800 interface. A flash control layer 232 controls the overall operation of back end module 210.

Additional components of memory system 100 illustrated in FIG. 2A include media management layer 238, which performs wear leveling of memory cells of non-volatile memory die 108. Memory system 100 also includes other discrete components 240, such as external electrical interfaces, external RAM, resistors, capacitors, or other components that may interface with controller 122. In alternative embodiments, one or more of the physical layer interface 222, RAID module 228, media management layer 238 and buffer management/bus controller 214 are optional components that are not necessary in the controller 122.

The Flash Translation Layer (FTL) or Media Management Layer (MML) 238 may be integrated as part of the flash management that may handle flash errors and interfacing with the host. In particular, MML may be a module in flash management and may be responsible for the internals of NAND management. In particular, the MML 238 may include an algorithm in the memory device firmware which translates writes from the host into writes to the memory 126 of memory die 108. The MML 238 may be needed because: 1) the memory may have limited endurance; 2) the memory 126 may only be written in multiples of pages; and/or 3) the memory 126 may not be written unless it is erased as a block (or a tier within a block in some embodiments). The MML 238 understands these potential limitations of the memory 126 which may not be visible to the host. Accordingly, the MML 238 attempts to translate the writes from host into writes into the memory 126.

Controller 122 may interface with one or more memory dies 108. In one embodiment, controller 122 and multiple memory dies (together comprising non-volatile memory system 100) implement a solid state drive (SSD), which can emulate, replace or be used instead of a hard disk drive inside a host, as a NAS device, in a laptop, in a tablet, in a server, etc. Additionally, the SSD need not be made to work as a hard drive.

Some embodiments of a non-volatile storage system will include one memory die 108 connected to one controller 122. However, other embodiments may include multiple memory die 108 in communication with one or more controllers 122. In one example, the multiple memory die can be grouped into a set of memory packages. Each memory package includes one or more memory die in communication with controller 122. In one embodiment, a memory package includes a printed circuit board (or similar structure) with one or more memory die mounted thereon. In some embodiments, a memory package can include molding material to encase the memory dies of the memory package. In some embodiments, controller 122 is physically separate from any of the memory packages.

In one embodiment, the control circuit(s) (e.g., control circuits 110) are formed on a first die, referred to as a control die, and the memory array (e.g., memory structure 126) is formed on a second die, referred to as a memory die. For example, some or all control circuits (e.g., control circuit 110, row decoder 124, column decoder 132, and read/write circuits 128) associated with a memory may be formed on the same control die. A control die may be bonded to one or more corresponding memory die to form an integrated memory assembly. The control die and the memory die may have bond pads arranged for electrical connection to each other. Bond pads of the control die and the memory die may be aligned and bonded together by any of a variety of bonding techniques, depending in part on bond pad size and bond pad spacing (i.e., bond pad pitch). In some embodiments, the bond pads are bonded directly to each other, without solder or other added material, in a so-called Cu-to-Cu bonding process. In some examples, dies are bonded in a one-to-one arrangement (e.g., one control die to one memory die). In some examples, there may be more than one control die and/or more than one memory die in an integrated memory assembly. In some embodiments, an integrated memory assembly includes a stack of multiple control die and/or multiple memory die. In some embodiments, the control die is connected to, or otherwise in communication with, a memory controller. For example, a memory controller may receive data to be programmed into a memory array. The memory controller will forward that data to the control die so that the control die can program that data into the memory array on the memory die.

Figure 2B:
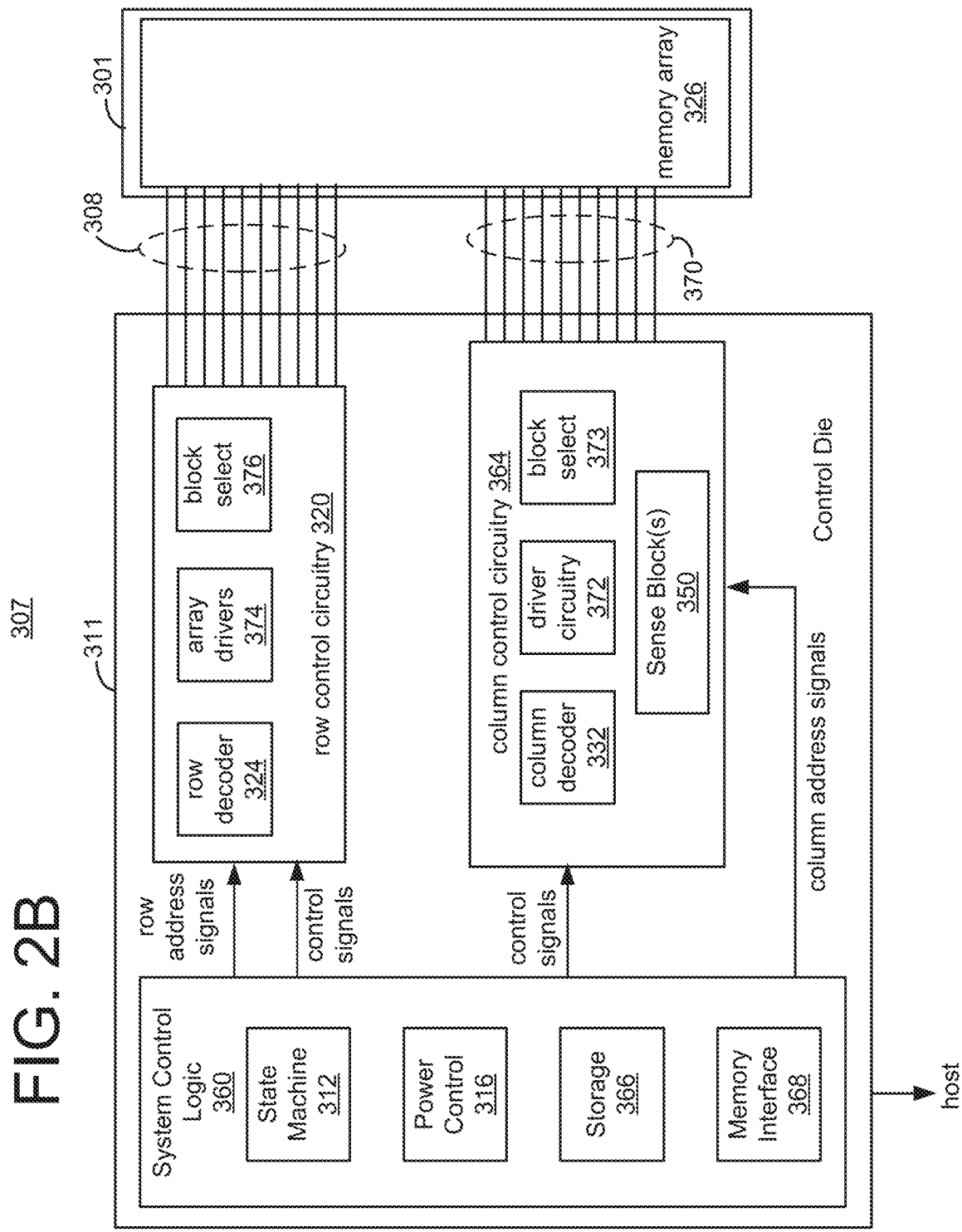

FIG. 2B shows an alternative arrangement to that of FIG. 2A which may be implemented using wafer-to-wafer bonding to provide a bonded die pair. FIG. 2B depicts a functional block diagram of one embodiment of an integrated memory assembly 307. One or more integrated memory assemblies 307 may be used in a memory package in memory system 100. The integrated memory assembly 307 includes two types of semiconductor die (or more succinctly, "die"). Memory die 301 includes memory array 326 (memory structure 326, which may be any suitable memory as described with respect to memory structure 126). Memory array 326 may contain non-volatile memory cells.

Control die 311 includes column control circuitry 364, row control circuitry 320 and system control logic 360 (including state machine 312, power control module 316, storage 366, and memory interface 368). In some embodiments, control die 311 is configured to connect to the memory array 326 in the memory die 301. FIG. 2B shows an example of the peripheral circuitry, including control circuits, formed in a peripheral circuit or control die 311 coupled to memory array 326 formed in memory die 301. System control logic 360, row control circuitry 320, and column control circuitry 364 are located in control die 311. In some embodiments, all or a portion of the column control circuitry 364 and all or a portion of the row control circuitry 320 are located on the memory die 301. In some embodiments, some of the circuitry in the system control logic 360 is located on the on the memory die 301.

System control logic 360, row control circuitry 320, and column control circuitry 364 may be formed by a common process (e.g., CMOS process), so that adding elements and functionalities, such as ECC, more typically found on a memory controller 102 may require few or no additional process steps (i.e., the same process steps used to fabricate controller 102 may also be used to fabricate system control logic 360, row control circuitry 320, and column control circuitry 364). Thus, while moving such circuits from a die such as memory die 301 may reduce the number of steps needed to fabricate such a die, adding such circuits to a die such as control die 311 may not require many additional process steps.

FIG. 2B shows column control circuitry 364 including sense block(s) 350 on the control die 311 coupled to memory array 326 on the memory die 301 through electrical paths 370. For example, electrical paths 370 may provide electrical connection between column decoder 332, driver circuitry 372, and block select 373 and bit lines of memory array (or memory structure) 326. Electrical paths may extend from column control circuitry 364 in control die 311 through pads on control die 311 that are bonded to corresponding pads of the memory die 301, which are connected to bit lines of memory structure 326. Each bit line of memory structure 326 may have a corresponding electrical path in electrical paths 370, including a pair of bond pads, which connects to column control circuitry 364. Similarly, row control circuitry 320, including row decoder 324, array drivers 374, and block select 376 are coupled to memory array 326 through electrical paths 308. Each of electrical path 308 may correspond to a word line, dummy word line, or select gate line. Additional electrical paths may also be provided between control die 311 and memory die 301.

In some embodiments, there is more than one control die 311 and/or more than one memory die 301 in an integrated memory assembly 307. In some embodiments, the integrated memory assembly 307 includes a stack of multiple control die 311 and multiple memory dies 301. In some embodiments, each control die 311 is affixed (e.g., bonded) to at least one of the memory dies 301.

The exact type of memory array architecture or memory cell included in memory structure 326 is not limited to the examples above. Many different types of memory array architectures or memory cell technologies can be used to form memory structure 326. No particular non-volatile memory technology is required for purposes of the new claimed embodiments proposed herein. Other examples of suitable technologies for memory cells of the memory structure 326 include ReRAM memories, magnetoresistive memory (e.g., MRAM, Spin Transfer Torque MRAM, Spin Orbit Torque MRAM), phase change memory (e.g., PCM), and the like. Examples of suitable technologies for architectures of memory structure 326 include two dimensional arrays, three dimensional arrays, cross-point arrays, stacked two dimensional arrays, vertical bit line arrays, and the like.

One example of a ReRAM, or PCMRAM, cross point memory includes reversible resistance-switching elements arranged in cross point arrays accessed by X lines and Y lines (e.g., word lines and bit lines). In another embodiment, the memory cells may include conductive bridge memory elements. A conductive bridge memory element may also be referred to as a programmable metallization cell. A conductive bridge memory element may be used as a state change element based on the physical relocation of ions within a solid electrolyte. In some cases, a conductive bridge memory element may include two solid metal electrodes, one relatively inert (e.g., tungsten) and the other electrochemically active (e.g., silver or copper), with a thin film of the solid electrolyte between the two electrodes. As temperature increases, the mobility of the ions also increases causing the programming threshold for the conductive bridge memory cell to decrease. Thus, the conductive bridge memory element may have a wide range of programming thresholds over temperature.

Magnetoresistive memory (MRAM) stores data by magnetic storage elements. The elements are formed from two ferromagnetic plates, each of which can hold a magnetization, separated by a thin insulating layer. One of the two plates is a permanent magnet set to a particular polarity; the other plate's magnetization can be changed to match that of an external field to store memory. A memory device is built from a grid of such memory cells. In one embodiment for programming, each memory cell lies between a pair of write lines arranged at right angles to each other, parallel to the cell, one above and one below the cell. When current is passed through them, an induced magnetic field is created.

Phase change memory (PCM) exploits the unique behavior of chalcogenide glass. One embodiment uses a GeTe—Sb2Te3 super lattice to achieve non-thermal phase changes by simply changing the co-ordination state of the Germanium atoms with a laser pulse (or light pulse from another source). Therefore, the doses of programming are laser pulses. The memory cells can be inhibited by blocking the memory cells from receiving the light. Note that the use of "pulse" in this document does not require a square pulse but includes a (continuous or non-continuous) vibration or burst of sound, current, voltage light, or other wave.

A person of ordinary skill in the art will recognize that the technology described herein is not limited to a single specific memory structure, but covers many relevant memory structures within the spirit and scope of the technology as described herein and as understood by one of ordinary skill in the art.

Figure 3:
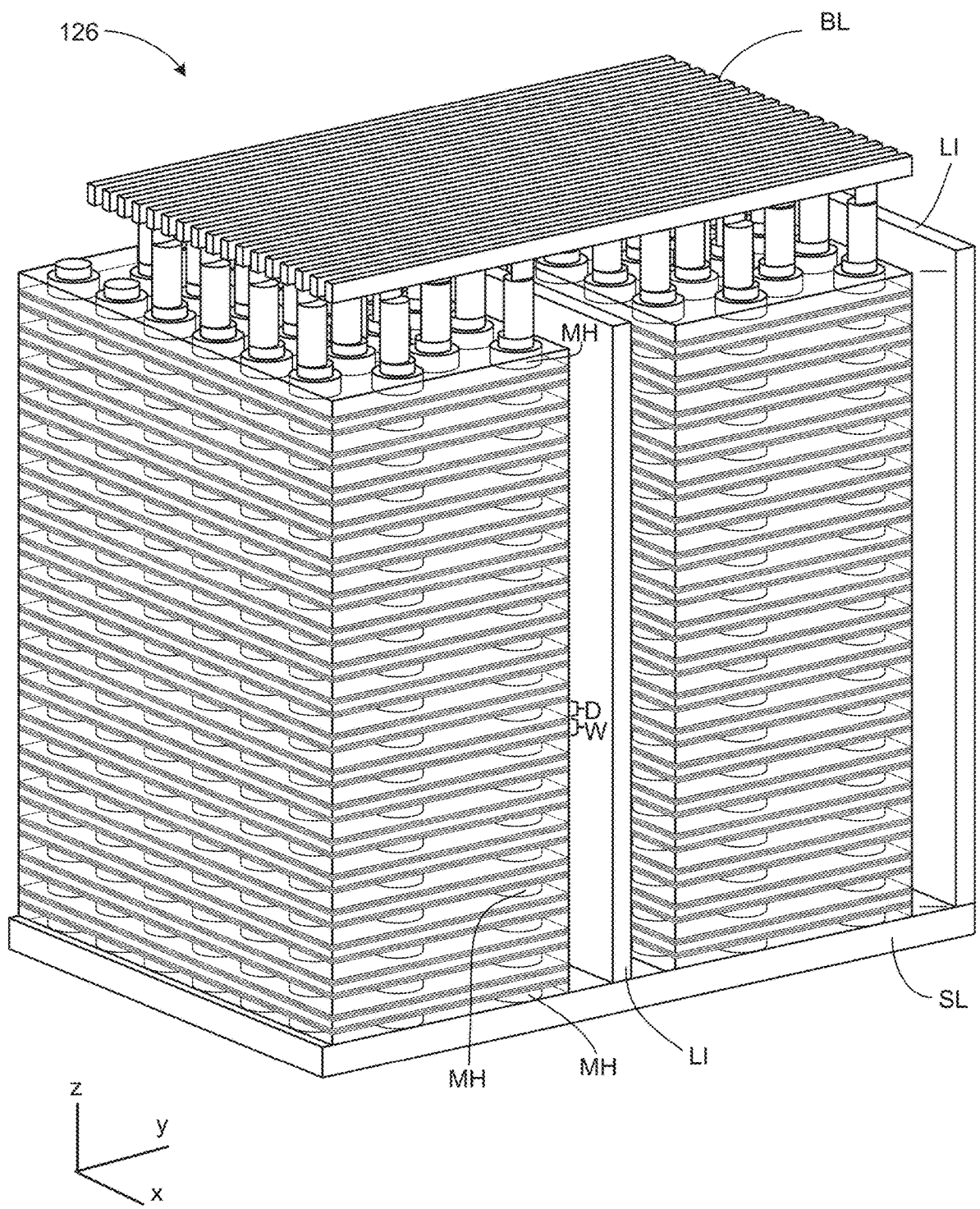
FIG. 3 is a perspective view of a portion of one embodiment of a monolithic three dimensional memory structure.

FIG. 3 is a perspective view of a portion of one example embodiment of a monolithic three dimensional memory array that can comprise memory structure 126 or 326, which includes a plurality non-volatile memory cells. For example, FIG. 3 shows a portion of one block of memory. The structure depicted includes a set of bit lines BL positioned above a stack of alternating dielectric layers and conductive layers. For example, one of the dielectric layers is marked as D and one of the conductive layers (also called word line layers) is marked as W. The number of alternating dielectric layers and conductive layers can vary based on specific implementation requirements. One set of embodiments includes between 108-300 alternating dielectric layers and conductive layers. One example embodiment includes 96 data word line layers, 8 select layers, 6 dummy word line layers and 110 dielectric layers. More or less than 108-300 layers can also be used. Data word line layers have data memory cells. Dummy word line layers have dummy memory cells. As will be explained below, the alternating dielectric layers and conductive layers are divided into "fingers" in regions that are separated by local interconnects LI. FIG. 3 shows two regions, each with respective NAND strings, and two local interconnects LI. Below the alternating dielectric layers and word line layers is a source line layer SL. Memory holes are formed in the stack of alternating dielectric layers and conductive layers. For example, one of the memory holes is marked as MH. Note that in FIG. 3, the dielectric layers are depicted as see-through so that the reader can see the memory holes positioned in the stack of alternating dielectric layers and conductive layers. In one embodiment, NAND strings are formed by filling the memory hole with materials including a charge-trapping material to create a vertical column of memory cells. Each memory cell can store one or more bits of data. More details of the three dimensional monolithic memory array that comprises memory structure 126 or 326 are provided below with respect to FIGS. 4A-4D.

Figure 4A:
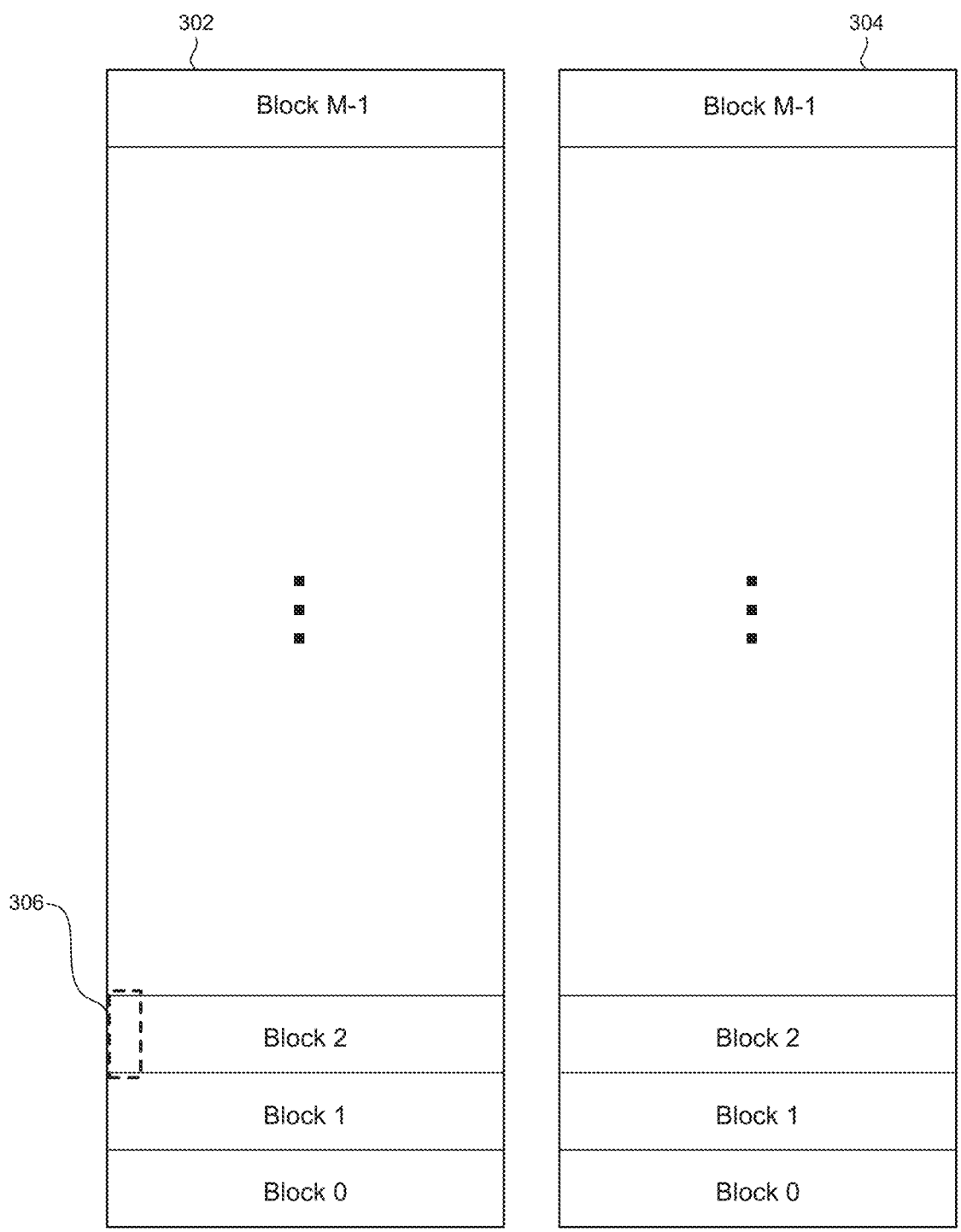
FIG. 4A is a block diagram of a memory structure having two planes.

FIG. 4A is a block diagram explaining one example organization of a memory structure (e.g., memory structure 126 or 326), which is divided into two planes 302 and 304. Each plane is then divided into M blocks. In one example, each plane has about 2000 blocks. However, different numbers of blocks and planes can also be used. In one embodiment, a block of memory cells is a unit of erase. That is, all memory cells of a block are erased together. In other embodiments, memory cells can be grouped into blocks for other reasons, such as to organize the memory structure 126 to enable the signaling and selection circuits. In some embodiments, a block represents a groups of connected memory cells as the memory cells of a block share a common set of word lines. Blocks may be connected by bit lines that are shared by multiple blocks.

Figure 4B:
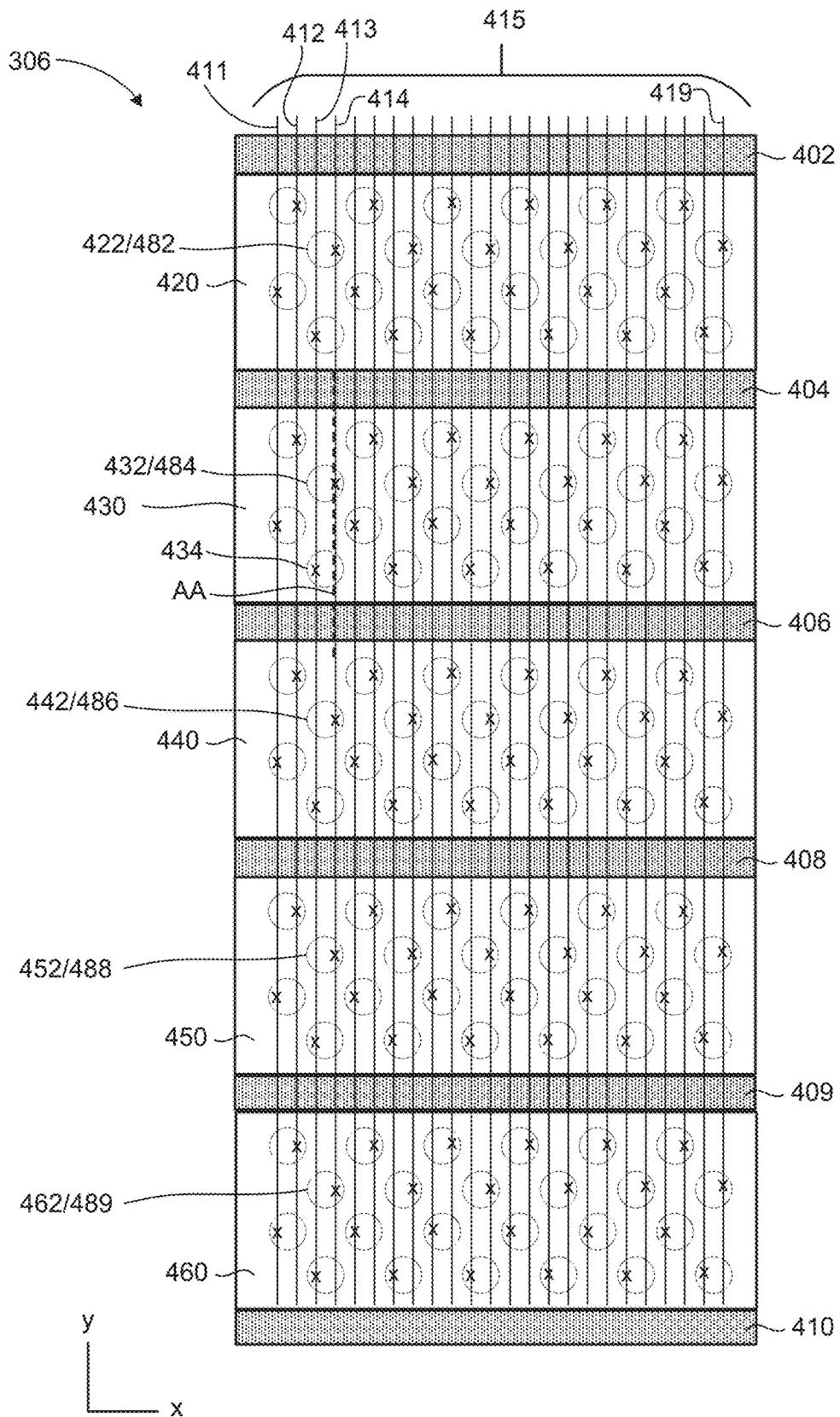
FIG. 4B depicts a top view of a portion of a block of memory cells.
Figure 4C:
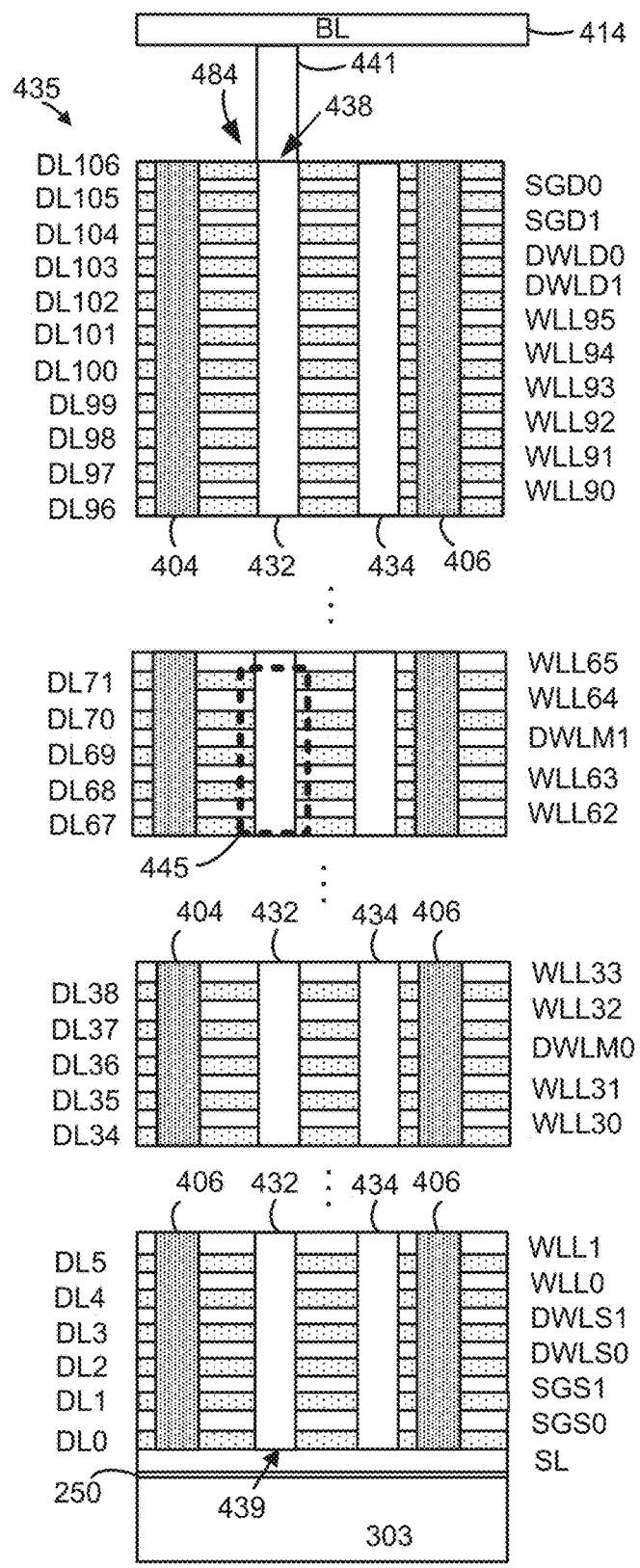
FIG. 4C depicts an embodiment of a stack showing a cross-sectional view along line AA of FIG. 4B.

FIGS. 4B-4D depict an example three dimensional ("3D") NAND structure that corresponds to the structure of FIG. 3 and can be used to implement memory structure 126 of FIG. 2A or 326 of FIG. 2B. FIG. 4B is a block diagram depicting a top view of a portion of one block from memory structure 126 or 326. The portion of the block depicted in FIG. 4B corresponds to block portion 306 in block 2 of FIG. 4A. In one embodiment, the memory array has many layers; however, FIG. 4B only shows the top layer.

FIG. 4B depicts a plurality of circles that represent the vertical columns. Each of the vertical columns include multiple select transistors (also referred to as a select gate or selection gate) and multiple memory cells. In one embodiment, each vertical column implements a NAND string. For example, FIG. 4B depicts vertical columns 422, 432, 442, 452 and 462. Vertical column 422 implements NAND string 482. Vertical column 432 implements NAND string 484. Vertical column 442 implements NAND string 486. Vertical column 452 implements NAND string 488. Vertical column 462 implements NAND string 489. More details of the vertical columns are provided below. The block depicted in FIG. 4B extends to include more vertical columns than depicted in FIG. 4B.

FIG. 4B also depicts a set of bit lines 415, including bit lines 411, 412, 413, 414, . . . 419. FIG. 4B shows twenty-four bit lines because only a portion of the block is depicted. It is contemplated that more than twenty-four bit lines connected to vertical columns of the block. Each of the circles representing vertical columns has an "x" to indicate its connection to one bit line. For example, bit line 414 is connected to vertical columns 422, 432, 442, 452 and 462 (one column, or NAND string, in each region).

The block depicted in FIG. 4B includes a set of local interconnects 402, 404, 406, 408, 409 and 410 that connect to a source line below the vertical columns. Local interconnects 402, 404, 406, 408, 409 and 410 also serve to divide each layer of the block into five regions; for example, the block depicted in FIG. 4B is divided into regions 420, 430, 440, 450 and 460, which are separated by local interconnects 402, 404, 406, 409 and 410, so that each layer is divided into portions which may be referred to as fingers. In the layers of the block that implement memory cells, the five portions are referred to as word line fingers that are separated by the local interconnects. In one embodiment, the word line fingers on a common level of a block connect together to form a single word line. In another embodiment, the word line fingers on the same level are not connected together. In one example implementation, a bit line only connects to one vertical column, or NAND string, in each of regions 420, 430, 440, 450 and 460. In one embodiment, NAND strings of different regions that are connected to a common bit line may be connected to the same word line (via different word line fingers on the same level that are connected together); therefore, the system uses the source side selection lines and the drain side selection lines to choose one (or another subset) to be subjected to a memory operation (program, verify, read, and/or erase). A given bit line may connect to a fixed number of NAND strings in each block. For example, bit lines 415 each connect to five NAND strings in block portion 306 (e.g., bit line 414 connects to NAND strings 482, 484, 486, 488 and 489). When performing memory access operations (e.g., programming and reading), such strings may be accessed at different times. For example, when programming or reading memory cells in a given level of a block, programming may proceed sequentially from region to region (string to string). Thus, memory access operations may access some or all NAND strings in region 420 of the block at a first time, access some or all NAND strings in region 430 at a second time, access some or all NAND strings in region 440 at a third time, access some or all NAND strings in region 450 at a fourth time and access some or all NAND strings in region 460 at a fifth time. In other examples, fewer or more than five such regions may be provided in a block. The NAND strings in a region of a block may be referred to collectively for convenience when referring to access operations directed to parallel access to such NAND strings. For example, accessing NAND strings of region 420 may be referred to as accessing "String 1," accessing NAND strings of region 430 may be referred to as accessing "String 2," accessing NAND strings of region 440 may be referred to as accessing "String 3," accessing NAND strings of region 450 may be referred to as accessing "String 4" and accessing NAND strings of region 460 may be referred to as accessing "String 5."

FIG. 4B also shows the vertical columns being staggered. In other embodiments, different patterns of staggering can be used. In some embodiments, the vertical columns are not staggered.

FIG. 4C depicts an embodiment of a stack 435 showing a cross-sectional view along line AA of FIG. 4B. Two SGD layers (SGD0, SDG1), two SGS layers (SGS0, SGS1) and six dummy word line layers DWLD0, DWLD1, DWLM1, DWLM0, DWLS0 and DWLS1 are provided, in addition to the data word line layers WLL0-WLL95. Each NAND string has a drain side select transistor at the SGD0 layer and a drain side select transistor at the SGD1 layer. In operation, the same voltage may be applied to each layer (SGD0, SGD1), such that the control terminal of each transistor receives the same voltage. Each NAND string has a source side select transistor at the SGS0 layer and a drain side select transistor at the SGS1 layer. In operation, the same voltage may be applied to each layer (SGS0, SGS1), such that the control terminal of each transistor receives the same voltage. Also depicted are dielectric layers DL0-DL106.

Columns 432, 434 of memory cells are depicted in the multi-layer stack. The stack includes a substrate 303, an insulating film 250 on the substrate, and a portion of a source line SL. A portion of the bit line 414 is also depicted. Note that NAND string 484 is connected to the bit line 414. NAND string 484 has a source-end 439 at a bottom of the stack and a drain-end 438 at a top of the stack. The source-end 439 is connected to the source line SL. A conductive via 441 connects the drain-end 438 of NAND string 484 to the bit line 414. The local interconnects 404 and 406 from FIG. 4B are also depicted.

FIG. 4D depicts an alternative view of the SG layers and word line layers of the stack 435 of FIG. 4C. The SGD layers SGD0 and SGD0 (the drain-side SG layers) each includes parallel rows of SG lines associated with the drain-side of a set of NAND strings. For example, SGD0 includes drain-side SG portions in regions 420, 430, 440, 450 and 460 consistent with FIG. 4B.

Below the SGD layers are the drain-side dummy word line layers. Each dummy word line layer represents a word line, in one approach, and is connected to a set of dummy memory cells at a given height in the stack. For example, DWLD0 comprises word line layer portions 451, 453, 455, 457 and 459. A dummy memory cell, also referred to as a non-data memory cell, does not store data and is ineligible to store data, while a data memory cell is eligible to store data.

Below the dummy word line layers are the data word line layers. For example, WLL95 comprises word line layer regions 470, 471, 472, 473 and 474.

Below the data word line layers are the source-side dummy word line layers DWLS0 and DWLS1. Each source-side dummy word line can be independently controlled, in one approach (e.g., different voltages may be applied to DWLS0 and DWLS1). Alternatively, the source-side dummy word lines may be connected and commonly controlled (e.g., same voltage may be applied to DWLS0 and DWLS1)

Below the source-side dummy word line layers are the SGS layers. The SGS layers SGS0 and SGS1 (the source-side SG layers) each includes parallel rows of SG lines associated with the source-side of a set of NAND strings. For example, SGS0 includes source-side SG lines 475, 476, 477, 478 and 479 as shown in FIG. 4D. Each SG line can be independently controlled, in one approach. Or the SG lines can be connected and commonly controlled.

When a data memory cell transistor is programmed, electrons are stored in a portion of the charge-trapping layer which is associated with the data memory cell transistor. These electrons are drawn into the charge-trapping layer from the channel, and through the tunneling layer. The Vth of a data memory cell transistor is increased in proportion to the amount of stored charge. During an erase operation, the electrons return to the channel.

Each of the memory holes can be filled with a plurality of annular layers comprising a blocking oxide layer, a charge trapping layer, a tunneling layer and a channel layer. A core region of each of the memory holes is filled with a body material, and the plurality of annular layers are between the core region and the WLLs in each of the memory holes.

In some cases, the tunneling layer 464 can comprise multiple layers such as in an oxide-nitride-oxide configuration.

Although the example memory system of FIGS. 3-4D is a three dimensional memory structure that includes vertical NAND strings with charge-trapping material, other (2D and 3D) memory structures can also be used with the technology described herein (e.g., other memory structures with NAND strings including a plurality of data memory cells coupled to a plurality of data word lines in series with a plurality of dummy memory cells connected to a plurality of dummy word lines). Different operations for accessing data in non-volatile memory cells (e.g., read, program, and program verify) that are described below may be applied to one or more of the example memory systems described above with respect to FIGS. 1-4D.

Typically, the program voltage applied to the control gates (via a selected word line) during a program operation is applied as a series of program pulses. Between programming pulses of program steps are a set of verify pulses to perform verification in verify steps (e.g., alternating program steps and verify steps in a program operation). In many implementations, the magnitude of the program pulses is increased with each successive pulse by a predetermined step size.

In one embodiment, the group of memory cells selected to be programmed (referred to herein as the selected memory cells) are programmed concurrently and are all connected to the same word line (the selected word line). There will likely be other memory cells that are not selected for programming (unselected memory cells) that are also connected to the selected word line. That is, the selected word line will also be connected to memory cells that are supposed to be inhibited from programming. For example, when data is written to a set of memory cells, some of the memory cells will need to store data associated with an erased state so they will not be programmed. Additionally, as memory cells reach their intended target data state, they will be inhibited from further programming. Those NAND strings (e.g., unselected NAND strings) that include memory cells connected to the selected word line that are to be inhibited from programming have their channels boosted to inhibit programming. When a channel has a boosted voltage, the voltage differential between the channel and the word line is not large enough to cause programming.

Figure 5:
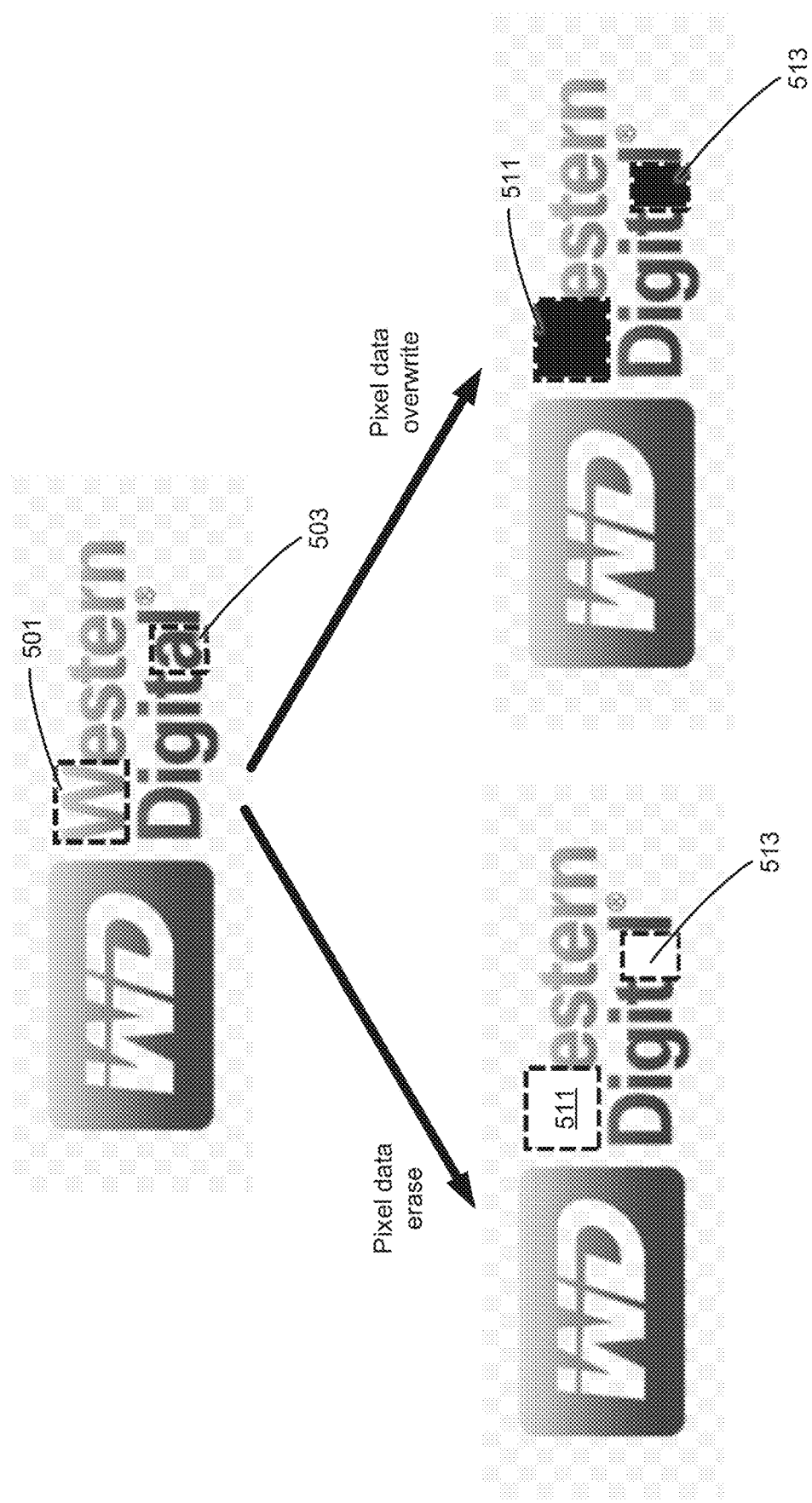
FIG. 5 illustrates the concept of data erase and data overwrite for data sanitation in the context of an image.

Data sanitization is a technique to destroy a portion of security information or data from a larger set of data, without impacting the remaining valid information or data. For example, data sanitation can be used to remove a portion of a text document or image. The most straightforward way is simply erasing the unwanted data; however some memory technologies, such as NAND memory (including the 3D NAND memory described above) only supports block erase, which requires extensive data allocation and hence significantly degrade NAND life time. Additionally, since blocks can be quite large, block level erase could delete data that is wanted to be retained. An alternate approach to data sanitation is to overwrite the data in order to destroy its content. FIG. 5 illustrates the two approaches.

FIG. 5 illustrate the concept of data erase and data overwrite for data sanitation of the context of an image. At top, FIG. 5 shows an image with two areas (501, 503) marked out for sanitation. At lower left, areas 511 (the capital "W") and 513 (the small "a") of FIG. 5 illustrates the pixel data erase of the areas 501 and 503 of the original image (where an erased pixel corresponds to white). Lower left of FIG. 5 illustrates where the case where pixel data of the areas 501 and 503 have been overwritten at 511 and 513. Although either approach will sanitize the data content, in a memory structure (such as NAND memory) with block level erase, in most cases the blocks will not align with the data wanting to be erased. Consequently, in these cases a data overwrite can be more effective. To overwrite the data to be sanitized, all of the corresponding memory cells can be programmed to the highest data store to eliminate any meaningful data content; however, such overwriting of memory cells in a previously programmed memory block can present difficulties. To help explain these, the program, erase, and sanitization operations are described in more detail with respect to FIGS. 6A-6C.

Figure 6A:
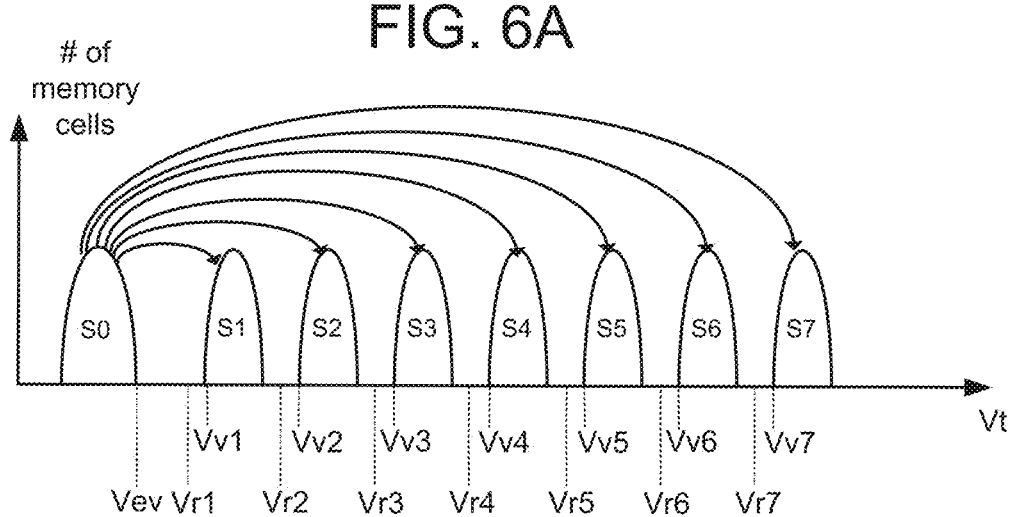
FIGS. 6A-C illustrate examples of program, erase, and sanitization operations.

FIG. 6A shows threshold voltage distributions for eight data states, S0 to S7, corresponding to three bits of data per cell (Three Level Cell, or TLC). Also shown are seven read reference voltages, Vr1, Vr2, Vr3, Vr4, Vr5, Vr6, and Vr7 for reading data from memory cells. By testing (e.g., performing sense operations) whether the threshold voltage of a given memory cell is above or below the seven read voltages, the system can determine what data state (i.e., S0, S1, S2, S3, . . . ) a memory cell is in.

FIG. 6A also shows seven verify reference voltages, Vv1, Vv2, Vv3, Vv4, Vv5, Vv6, and Vv7 used in read verify steps during a programming operation. When programming memory cells to data state S1, the system will test whether those memory cells have a threshold voltage greater than or equal to Vv1. When programming memory cells to data state S2, the system will test whether the memory cells have threshold voltages greater than or equal to Vv2. When programming memory cells to data state S3, the system will determine whether memory cells have their threshold voltage greater than or equal to Vv3. When programming memory cells to data state S4, the system will test whether those memory cells have a threshold voltage greater than or equal to Vv4. When programming memory cells to data state S5, the system will test whether those memory cells have a threshold voltage greater than or equal to Vv5. When programming memory cells to data state S6, the system will test whether those memory cells have a threshold voltage greater than or equal to Vv6. When programming memory cells to data state S7, the system will test whether those memory cells have a threshold voltage greater than or equal to Vv7.

In general, during sensing of verify and read operations, the selected word line is connected to a voltage (one example of a reference signal or read voltage), a level of which is specified for each read operation (e.g., see read compare levels Vr1, Vr2, Vr3, Vr4, Vr5, Vr6, and Vr7, of FIG. 6A) or verify operation (e.g. see verify target levels Vv1, Vv2, Vv3, Vv4, Vv5, Vv6, and Vv7 of FIG. 6A) in order to sense whether a threshold voltage of the concerned memory cell has reached such level. After applying the read voltage to the word line, the conduction current of the memory cell is measured to determine whether the memory cell turned on (conducted current) in response to the voltage applied to the word line. If the conduction current is measured to be greater than a certain value (e.g., Isense), then it is assumed that the memory cell turned on and the voltage applied to the word line is greater than the threshold voltage of the memory cell. If the conduction current is not measured to be greater than the certain value, then it is assumed that the memory cell did not turn on and the voltage applied to the word line is not greater than the threshold voltage of the memory cell. During a read or verify process, the unselected data memory cells are provided with one or more read pass voltages (also referred to as bypass voltages) at their control gates so that these data memory cells will operate as pass gates (e.g., conducting current regardless of whether they are programmed or erased), select gates of selected NAND strings are provided with sufficient voltage (e.g., select voltages via select lines) to make corresponding select transistors conductive ("turn on") and dummy memory cells of selected NAND strings are provided with sufficient voltage (e.g., dummy word line voltage via dummy word lines) to make corresponding dummy memory cells conductive.

There are many ways to measure the conduction current of a memory cell during sensing in a read or verify operation. In one example, the conduction current of a memory cell is measured by the rate it discharges or charges a dedicated capacitor in the sense amplifier. In another example, the conduction current of the selected memory cell allows (or fails to allow) the NAND string that includes the memory cell to discharge a corresponding bit line. The voltage on the bit line is measured after a period of time to see whether it has been discharged or not. Note that the technology described herein can be used with different methods known in the art for sensing during verify or read operations. Other read and verify techniques known in the art can also be used.

Figure 6B:
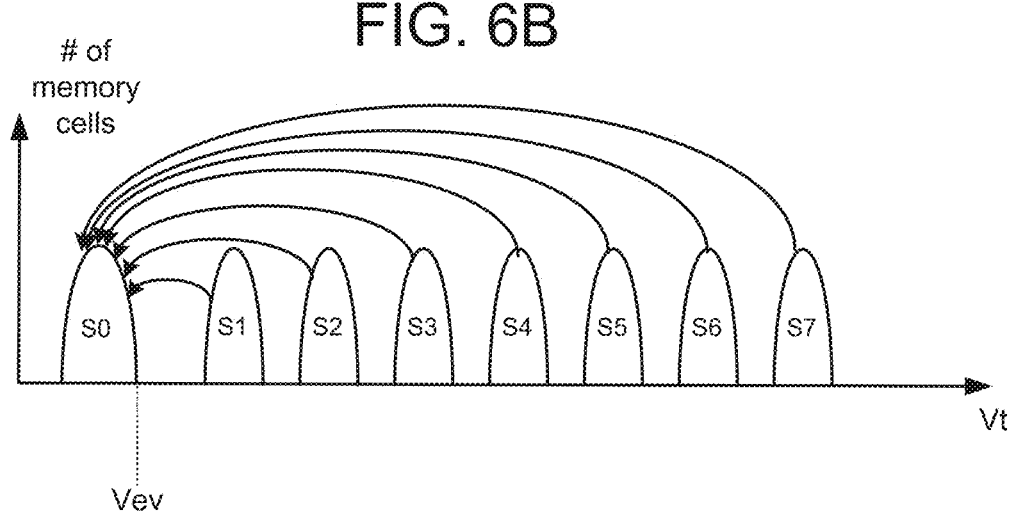

FIG. 6B illustrates an example of an erase operation performed on previously programmed memory cells (e.g., memory cells programmed to distributions S1 to S7 as illustrated in FIG. 6A). When a block is erased, memory cells of the block have their threshold voltages reduced from their programmed data states (e.g., from data states S1 to S7) to the erased state (S0). FIG. 6B shows Vev, which is a voltage level to test whether a memory cell has been properly erased (e.g., whether a memory cell is in the S0 data state). An erase operation may continue until all (or substantially all) memory cells in a block have a threshold voltage less than Vev.

As noted above, in some cases it may be desirable to destroy data that is stored in non-volatile memory cells (e.g., for security reasons). While an erase operation may be used to erase an entire block (e.g., setting threshold voltages of all memory cells to S0 data state) to thereby destroy all data stored in the block, in some cases it may be undesirable to immediately erase an entire block which contains data to be destroyed. For example, erasing a block may require significant time and/or resources. If valid data is stored in the block then copying such valid data prior to erase may further increase time and/or resources needed. And erasing may increase wear on a block.

Figure 6C:
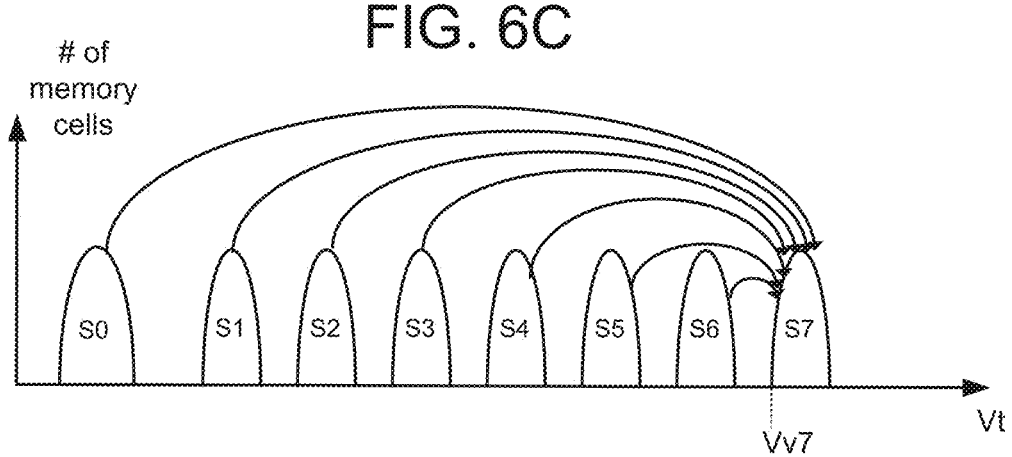

FIG. 6C shows an example of a method of destroying data in a block, or a portion of a block, without erasing the block using an operation referred to as data sanitization. In a data sanitization operation, threshold voltages of memory cells are increased from their programmed states (e.g., S1-S6) or the erase state (S0) to a higher threshold voltage (e.g., to the S7 data state). Increasing threshold voltage in a sanitization operation may be performed by applying voltage pulses in a manner similar to a program operation. Such an operation may be directed to a portion of a block that is less than the entire block. For example, an individual word line, or portion of a word line may be sanitized while other word lines in the block are not sanitized and continue to store data. Thus, a subset of data in a block (some or all data of one or more word lines) may be sanitized without performing an erase operation and without moving any data from the block.

FIG. 6C shows a data sanitization operation performed on previously programmed memory cells (e.g., memory cells programmed to distributions S1 to S7 as illustrated in FIG. 6A). A data sanitization operation may be performed in response to a command from a user that identifies specific data to sanitize. When data sanitization is applied to memory cells, the threshold voltages of the memory cells are increased from data states corresponding to user data to a threshold voltage range that does not correspond to the user data so that the user data cannot be obtained from threshold voltages of the memory cells. The verify voltage Vv7 is a used to test whether memory cells have been properly sanitized. A sanitization operation may continue until all (or substantially all) memory cells to be sanitized have a threshold voltage greater than a predetermined target threshold voltage (e.g., Vv7).

While the example of FIG. 6C shows all memory cells in data states S0-S6 having their threshold voltages increased, in other embodiments only a subset of memory cells may have their threshold voltages increased (e.g., only memory cells in certain data states such as only S3-S6). While the example of FIG. 6C shows all memory cells in data states S0-S6 having their threshold voltages increased to a single threshold voltage range corresponding to data state S7, a different threshold voltage range, or ranges, may be chosen. For example, a threshold voltage range that is less or greater than that of data S7 may be used. In an example, two or more threshold voltage ranges may be used for two or more groups of data states (e.g., memory cells in data states S0 to S2 may be sanitized by increasing their threshold voltages to a first range corresponding to data state S3 and memory cells in data states S4 to S6 may be sanitized by increasing their threshold voltages to a second range corresponding to data state S7). In some cases, memory cells may be sanitized by increasing their threshold voltages to threshold voltage ranges that are randomized (e.g., threshold voltages of some memory cells in data state S1 are increased to data state S7 as shown while others are increased to another threshold voltage range such as S2 to S6). In the example of FIG. 6C, only memory cells that are programmed to data state S7 are unaffected by a sanitization operation while in other examples additional memory cells may be unaffected as long as a sufficient number of memory cells are changed to ensure that the stored data cannot be recovered. In examples of sanitization operations, at least some non-volatile memory cells in a group of non-volatile memory cells to be sanitized have their threshold voltages increased to one or more threshold voltage ranges outside their programmed threshold voltage ranges.

Overwriting the selected data to the highest data level (all to S7 in the above example) can be used in NAND memory to destroy data at the level of a page, a sub-block (such as a finger as illustrated with respect to FIG. 3), or single word line with the allocation of target write data. Also, as all memory cells are being programmed to the highest state, the number of verify operations is small and this sort of sanitation can be executed relatively quickly. However, programming along a word line in a previously programmed block of NAND memory has some challenges as it can be difficult to properly bias the selected memory cells and the unselected memory cells (whose data is meant to be retained) can suffer from program disturb (i.e., have their threshold voltage experience some amount of unwanted shift).

In writing a NAND memory, such as for the 3D structure illustrated with respect to FIGS. 3 and 4A-4D, a previously erased block of memory cells is written from one end to the other. For example, referring to FIG. 4C, in normal order programming the word lines are written starting from the source end with word line 0 (WLL0) and sequentially writing to the drain end (here WLL95). Consequently, when witting a given word line, word line WLn, all of the word lines on the source side have already been written and all of the word lines on the source side are still erased. As the erased memory cells on the drain side of WLn still have the erased voltage threshold, the selected WLn can readily be biased at the drain end 438 from the bit line 414, both for pre-charging the selected memory cells and also for biasing the selected memory cells to either a program enable or program inhibit level from the bit line 414 prior to applying a program pulse along the selected WLn. To perform such a biasing from the source line end at 439 would require all of the previously programmed word lines (word lines 0 to N−1) to be biased so that all of the memory cells along them would be on, which could disturb the data state of the previously programmed memory cells.

In some embodiments, memory cells along the NAND strings can alternately or additionally programmed using reverse order programming, starting from the drain end 438 and progressing toward the source end. This sort of reverse order programming can be used, for example, when the memory structure of FIGS. 3 and 4A-4D can be operated as upper and lower sub-blocks respectively corresponding to the upper half or so of word lines (e.g., respectively WLL64-WL95 and WLL0-WLL63 in FIG. 4C). If the previously written memory block has its lower (but not upper) sub-block is erased, reverse order programming could be used when subsequently writing the lower sub-block as this avoids having to bias the lower block thought the programmed upper sub-block. When performing a data sanitation on a word line of a previously written block, however, the memory cells to either side of the selected word line can have valid data that is meant to be retained, so it is difficult to properly bias the selected memory cells of the NAND string from either the source or drain end.

Considering this issue during the pre-charge process that is performed prior to applying a programming pulse to a selected word line, one approach to pre-charging the NAND string's channel is to use an increased channel pre-charge voltage VCHPCH as a bias voltage on un-selected word lines, where VCHPCH is higher than the threshold voltage Vth of the highest data state so that a pre-charge path can be turned on. However, this method has two concerns. On one hand, though the channel pre-charge path can be turned on during a VCHPCH pulse, once VCHPCH is ramped down before the program pulse, trapped electrons from data pattern can flow back and couple down the target word line's channel voltage, leading to a degraded channel pre-charge. On the other hand, this method can work for small volume data sanitization, but once a relatively large volume of data (e.g., all word lines of a given finger in a 3D NAND structure) needs to be sanitized, un-selected word lines will be exposed to read disturb risk because of the high VCHPCH. This can be illustrated with respect to FIG. 7 that applies this approach to pre-charging the NAND string channel from, in this example, the source side.

Figure 7:
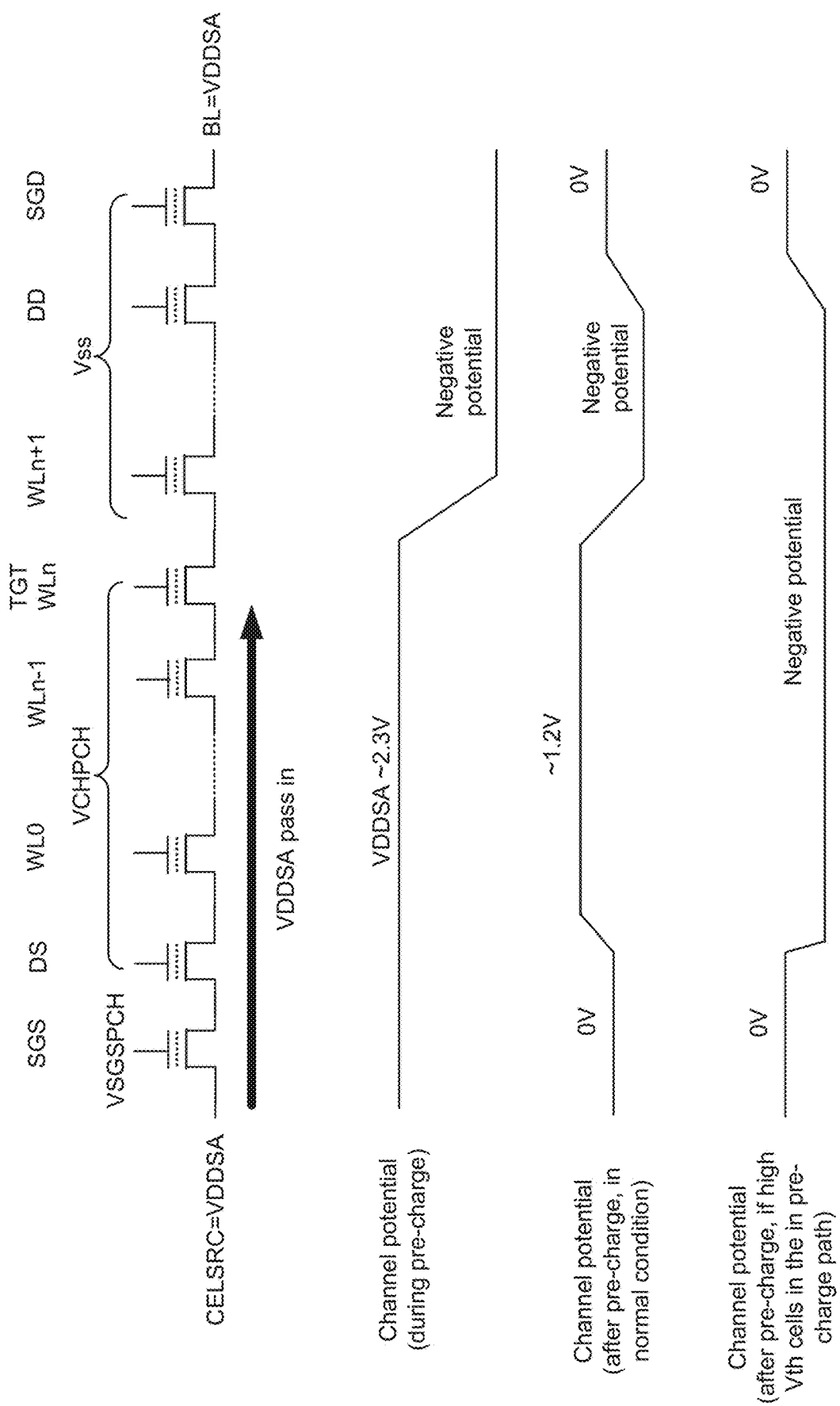
FIG. 7 illustrates pre-charging a NAND string channel for a data sanitation of a selected word line using a conventional pre-charge, or "electron pre-charge", from the source end.

FIG. 7 illustrates pre-charging a NAND string channel for a data sanitation of a selected word line using a conventional pre-charge, or "electron pre-charge", from the source end. At top, FIG. 7 illustrates the NAND string biased for pre-charge, and aligned below are the channel potential during pre-charge, after pre-charge when performed under normal conditions, and after pre-charge if the NAND string has previously been programmed. In conventional channel pre-charge, the main purpose is to pass a voltage, such as the high level used by the sense amplifiers of VDDSA, to the target word line WLn channel, and to reduce the amount of residual channel electrons around the target word line WLn. The channel voltage VDDSA can be applied to both the source line CELSRC and bit line BL In this example, the channel is pre-charged from the source end, so that the word lines on drain side (WLn+1 to DD, a drain side dummy word line in this example) drain side select gate SGD are biased to Vss (i.e., ground). Turning on the source side select gate with a select gate pre-charge voltage VSGCPCH and applying VCHPCH to word lines WL0-WLn−1 and, in this example, source side dummy word line DS allows VDDSA to pass in the channel up to the target word line WLn. As illustrated underneath, during pre-charge, to the source side of WLn, the channel is at VDDSA (~2.3V, for example), while on the drain side it is at a negative potential. The VCHPCH level is then ramped down to complete the pre-charge process.

The center voltage profile illustrates the voltage levels in the channel after the pre-charge in normal conditions for programming when, in this example, using reverse programming order. In this case the memory cells along all of WL0-WLn−1 are still in their erased state. During the subsequent VCHPCH ramp down electrons back flow will make the channel potential on the source side lower than VDDSA, such as ~2.3V in this example, the final channel potential remains positive. This boosted channel provides a better boost condition than an un-boosted channel for the subsequent program pulse.

If some of the memory cells in the electrons' pre-charge path along word lines WL0-WLn−1 are instead in a programmed state and have a higher Vth, these higher Vth memory cells may not be turned on by VCHPCH as it ramps down. Because of this, trapped channel electrons around the target WLn cannot be reduced, as illustrated in bottom voltage profile. Although the source and drain ends are taken to 0V by setting the source line and bit line to ground, the channel region under all of the memory cells of the NAND string are at a negative potential, which can lead to large amounts of program disturb when the programming pulse is applied.

To help with this issue, the following embodiments present an alternate "hole pre-charge" in which holes are transferred into the NAND channel. This process can be illustrated with respect to FIG. 8.

Figure 8:
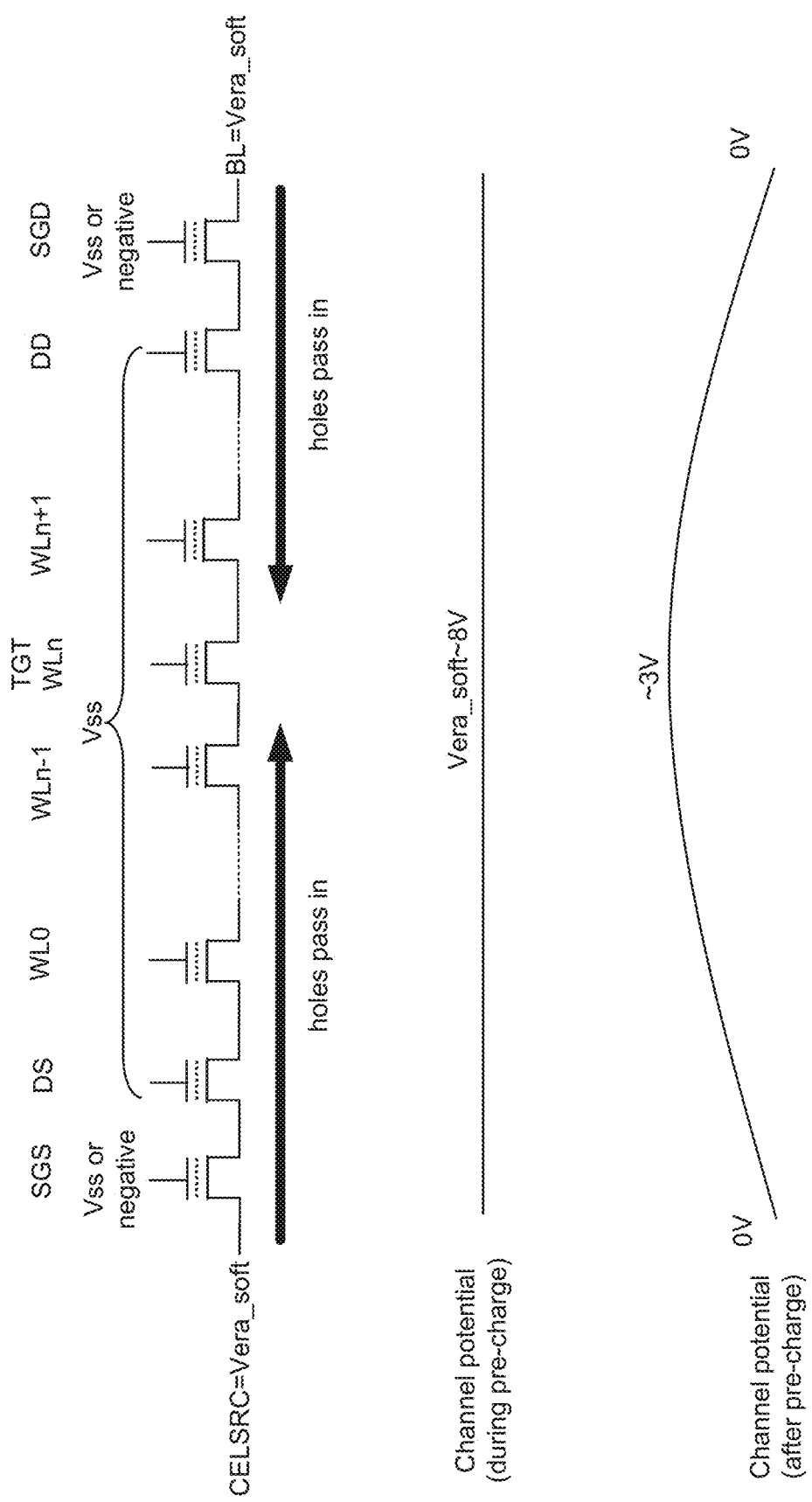
FIG. 8 illustrates an embodiment for a hole pre-charge of the NAND string channel, such as could be used in data sanitation operation.

FIG. 8 illustrates an embodiment for a hole pre-charge of the NAND string channel, such as could be used in data sanitation operation. At top FIG. 8 illustrates an example set of bias conditions for the hole based pre-charge, underneath which are aligned the voltage profile of the channel during pre-charge and after pre-charge. The bias levels of a hole pre-charge is similar to an erase process, but with a lower erase—or soft erase—voltage. All of the word lines, including the dummy word lines DS and DD, are set to Vss, the select gates SGS and SGD are biased to be off by VSS or a negative voltage, and the source line and bit line are set to a soft erase voltage of, for example, ~8V. In this pre-charge embodiment, holes are injected from one or both of the source and drain sides of the NAND string, in a soft erase, into the channel to clean residual and trapped electrons. At shown at center, this results in the channel potential during pre-charge the full extent of the channel will be at the soft erase voltage of Vera_soft of ~8V. After the hole-based channel pre-charge, some holes are trapped in the channel due to low Vth or erased cells along the NAND string, leading to a positive potential voltage profile, as illustrated at the bottom of FIG. 8, prior to the following programming pulse. The manner of hole injection could be forward bias on p-n junction or gate induced drain leakage (GIDL), depending on the embodiment.

To perform a data sanitation on selected memory cells, the memory cells be programmed to the highest data state, such as S7 in the three bit per cell MLC example discussed above, by an alternating series of the hole based pre-charges and programming pulses. This process can be illustrated with respect to FIGS. 9-11.

Figure 11:
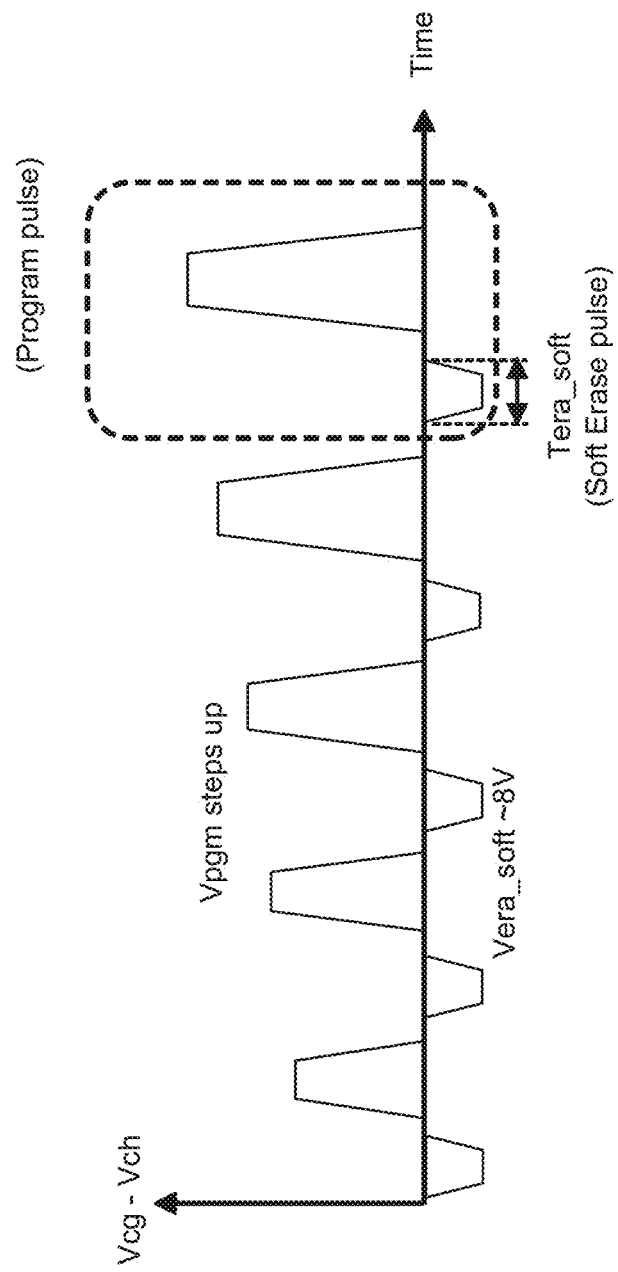

FIGS. 9, 10, and 11 respectively illustrate the biasing of a NAND string for hole based channel pre-charge, a program pulse, and an alternating series of the two during an embodiment for data sanitation. In FIG. 9, the NAND string of a selected memory cell along a selected word line WLn has all of the control gates of its transistors biased at a low voltage, here Vss or 0V, by biasing the word lines WL0-WLmax, the dummy word lines, and select gate control lines for SGD and SGS to ground. This is the same biasing as described with respect to FIG. 8 and where, as illustrated in FIG. 8, other bias level can be used depending on the embodiment, such as applying a negative voltage to the select gates. When a soft erase voltage of, for example, Vera_soft=~8V, is applied at the source line and at the bit line, holes will be pulled into the channel, resulting in the voltage profile at the bottom of FIG. 8.

Once pre-charged, a program pulse is applied to a selected word line such as by biasing the NAND as in the embodiment of FIG. 10. The non-selected word lines, including any dummy word lines, are biased at the program pass voltage Vpass so that they are on for whatever their programmed state and select gates SGD and SGS are biased at their respective on voltages of VSGD and VSGS. With the source line biased low, such as at Vss, at the corresponding bit line biased at either the program enable or program inhibit voltage, such as Vss or VDDSA, the programming pulse Vpgm is applied to the selected word line WLn.

The alternating of the soft erase pulses and program pulses for one embodiment is illustrated schematically by the waveform of FIG. 11. In FIG. 11 the horizontal axis is time and the vertical axis is the voltage difference between the control gate voltage applied to the selected word line WLn and the channel voltage, Vcg-Vch. The waveform for the programming pulse voltage Vpgm can be an increasing staircase the that steps up in amplitude with each pulse, as in a standard programming embodiment, with the NAND strings along the word line biased as in FIG. 10. Preceding each programming pulse, the soft erase pulse with an amplitude of Vera-soft and duration Tera-soft is applied in the hole based pre-charge to the NAND strings with the bias conditions of FIG. 9. As illustrated, this results in a negative (Vcg-Vch) value. At each location (column, word line, sub-block/finger) that is selected for data sanitization, the control circuitry can apply the paired soft erase-program loop until all bits verify at the highest state, such as S7 in the tri-level MLC example. (The verify sensing operations are not shown in FIG. 11, but see FIG. 13.) The Vera_soft and Tera_soft values can be settable parameters that control the soft erase pulse amplitude and width. The values for these parameters can be determined as part of device characterization and stored as parameters in, for example, system control logic storage 366. For example, a parameter could specify Vera_soft and Tera_soft of 5-12V and 1-20 uS, respectively.

A number of variations on the example embodiment are possible since, unlike a standard data write, in data sanitation all of the selected memory cells are being written to the highest state. Consequently, in alternate embodiments, some or all post-program pulse verifies can be eliminated; and even when verifies are performed to avoid memory cell stress due to overprogramming, only a single state (e.g., S7) needs to be checked. Additionally, in some embodiments the programming voltage staircase can differ from standard programming, such as starting with a higher initial level or have larger step sizes.

Figure 12:
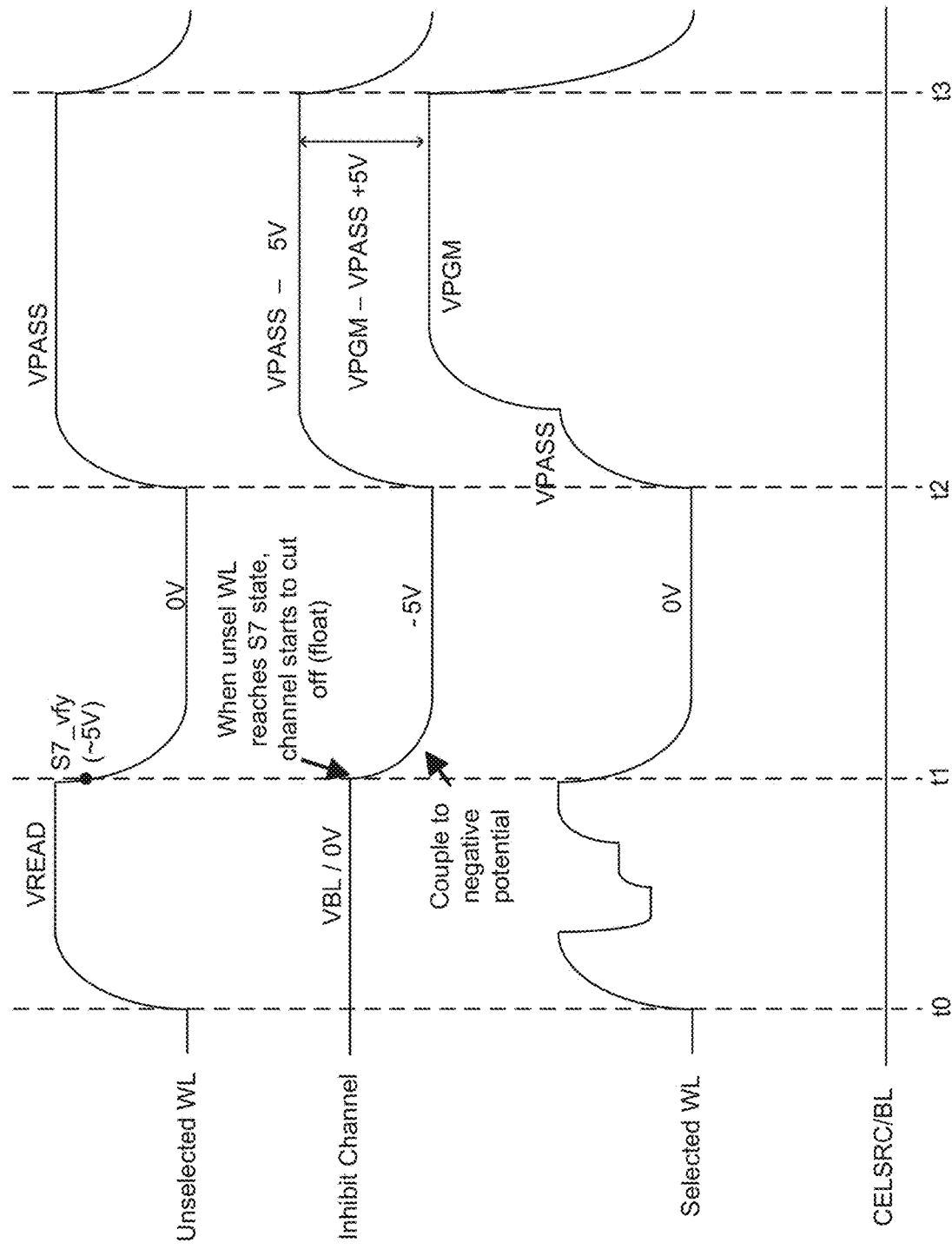
FIGS. 12 and 13 respectively illustrate a set of waveforms for data sanitation without and with a hole based pre-charge.
Figure 13:
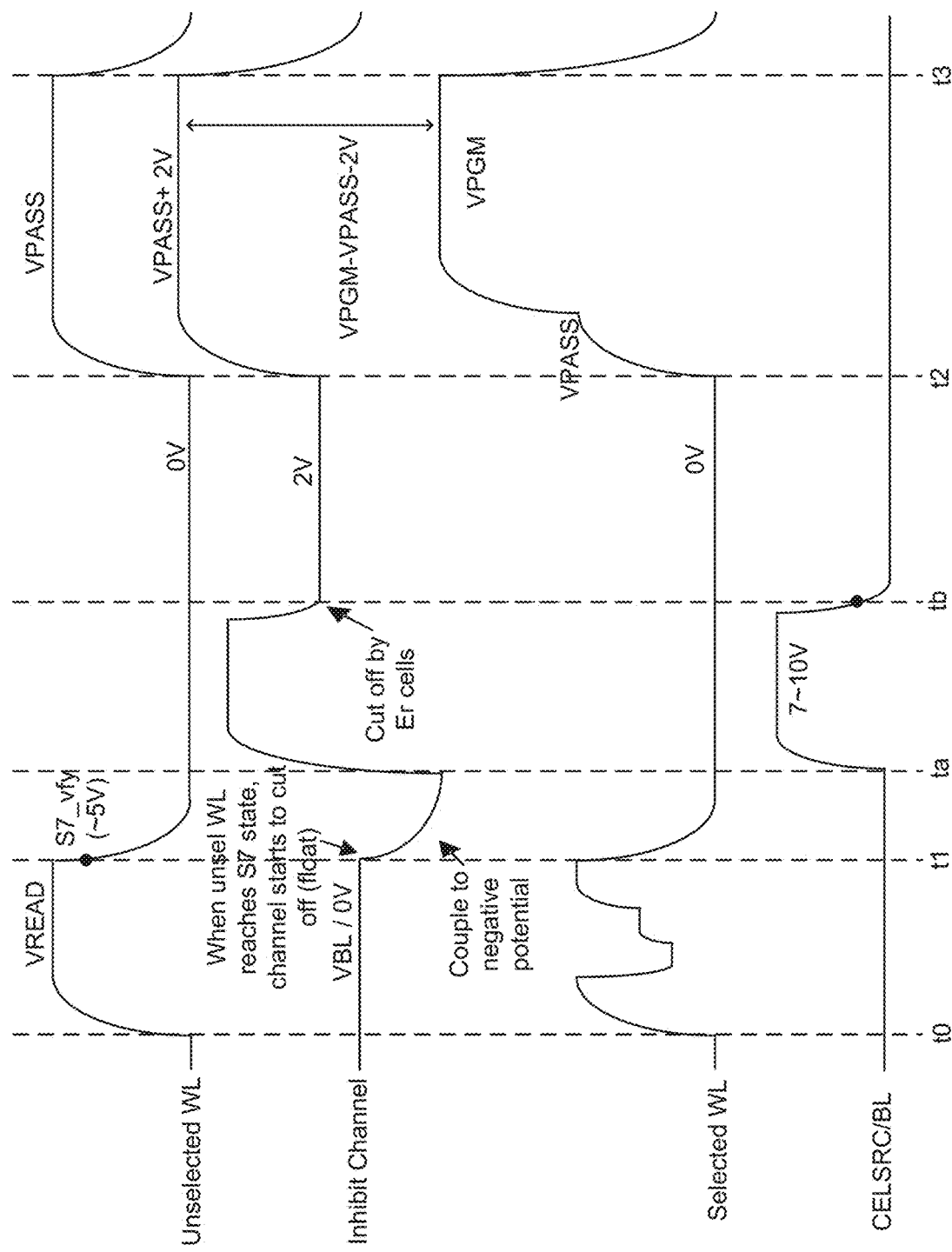

FIGS. 12 and 13 respectively illustrate a set of waveforms for data sanitation without and with a hole based pre-charge. In both of FIGS. 12 and 13, the top line is the waveform applied to the unselected word lines; the second line is the voltage level of the channel under the non-selected, program inhibited memory cells; the third line is the selected word line waveform; and the bottom line is the voltage level biasing the source line (CELSRC) and the bit line between which the NAND string is connected. The figures illustrate one cycle of an embodiment for a programming loop, with a verify operation between t0 and t1; a pre-charge between t1 and t2; and a program pulse between t2 and t3.

Considering FIG. 12, the unselected word line waveform can be a typical NAND waveform, where at to this is ramped to the unselected word line read voltage, VREAD, which is a voltage high enough to turn on an unselected memory cell for any of the data states. In the tri-level MLC examples used here, Vread is high enough to turn on the S7 state, so at least sufficiently above the S7 verify voltage S7-$vfy$ of, for example, ~5 v. At t1, the unselected word lines are taken back to ground until t2, when they are ramped up to VPASS for the program pulse, and then dropped back to ground at t3. (If an electron based pre-charge like that described above with respect to FIG. 7 were used, then the word lines on either the drain side, for normal order program, or source side, for reverse order program, would be biased to VCHPCH between t1 and t2.)

For a selected word line, the waveform can again be as for a standard program, although only the highest state is checked if the embodiment includes program verify. For the verify operation between t0 and t1, the word line is raised up initially with the unselected word lines and then set to the sensing levels. In the case of a data sanitation, as all selected memory cells are being programmed to the highest data state of, here, S7, only the S7 data state is checked. If a quick pass write algorithm is used, both a low S7 verify and a standard S7 verify can be performed, with a memory cell that verifies at the low, but not the high level is partially inhibited and a memory cell that verifies at the high verify level is fully inhibited from further programming. The selected word line can then be taken to ground between t1 and t2 to settle. (If an electron based pre-charge is used as described with respect to FIG. 7, the selected word line can be taken to VCHPCH between t1 and t2.) Between t2 and t3, the program pulse is applied to the selected word line, initially ramping up to VPASS before going to the full VPGM amplitude, whose amplitude will depend on the program loop. Across the whole of the process, the source line (CELSRC) and bit line can be held constant. (If an electron based pre-charge is used as described with respect to FIG. 7, CELSRC and the bit line would be at VDDSA between t1 and t2.)

For the inhibited channel under an unselected word line, between t0 and t1, this will initially be at either the bit line voltage or ground during the verify phase. When performing data sanitation, the memory cells of the NAND string to either side of a selected memory cell will have previously been programmed, with one or more of them likely being at the highest program state (again S7 in the example case). As the unselected word lines begin to ramp down at t1, once it reaches this highest Vth value, such as S7_$vfy$=~5V indicated, the channel will begin to be cut off and begin to float. Because of this, as the word lines continue to 0V, the inhibit channel will couple to a negative potential and be pulled down to about-5V in this example. Once the unselected word lines ramp up to VPASS at t2, the inhibit channel will be pulled up, but starting from the −5V level so that it will only reach VPASS-5V. The amount of program disturb from the programming pulse VPGM will depend on the difference between the inhibit channel and VPGM, or VPGM−(VPASS−5V)=VPGM−VPASS+5V, or more generally VPGM−VPASS+Vth for Vth of the highest state.

The introduction of the hole-based pre-charge can provide an improved voltage differential between the inhibit channel and the program pulse, as illustrated by FIG. 13. When including a hole channel pre-charge, the unselected and selected word lines can be as illustrated with respect to FIG. 12. Now, however, between t1 and t2, a soft erase pulse is applied at one or both of the source line and bit line. As illustrated along the bottom waveform of FIG. 13, some time ta after t1 a soft erase pulse of, for example, 7-10V, is applied from the ends of the NAND string. As describe with respect to FIG. 8, this pulls up the inhibit channel. After the interval Tera_soft, prior to t2 at tb the erase pulse ramps back down, bringing the inhibit channel also back down until cut off by the erased (or, more generally lowest Vth) state memory cells along the NAND string; but, as discussed with respect to FIG. 8, this will be at a value of a low positive voltage of, for example, 2V. Once the word lines ramp up to VPASS at t2, the inhibit channel will then be pulled up to VPGM−(VPASS+2V)=VPGM−VPASS−2V. This will result in a reduced amount of program disturb for the unselected memory cells when the program pulse goes to VPGM in each program cycle.

Figure 14:
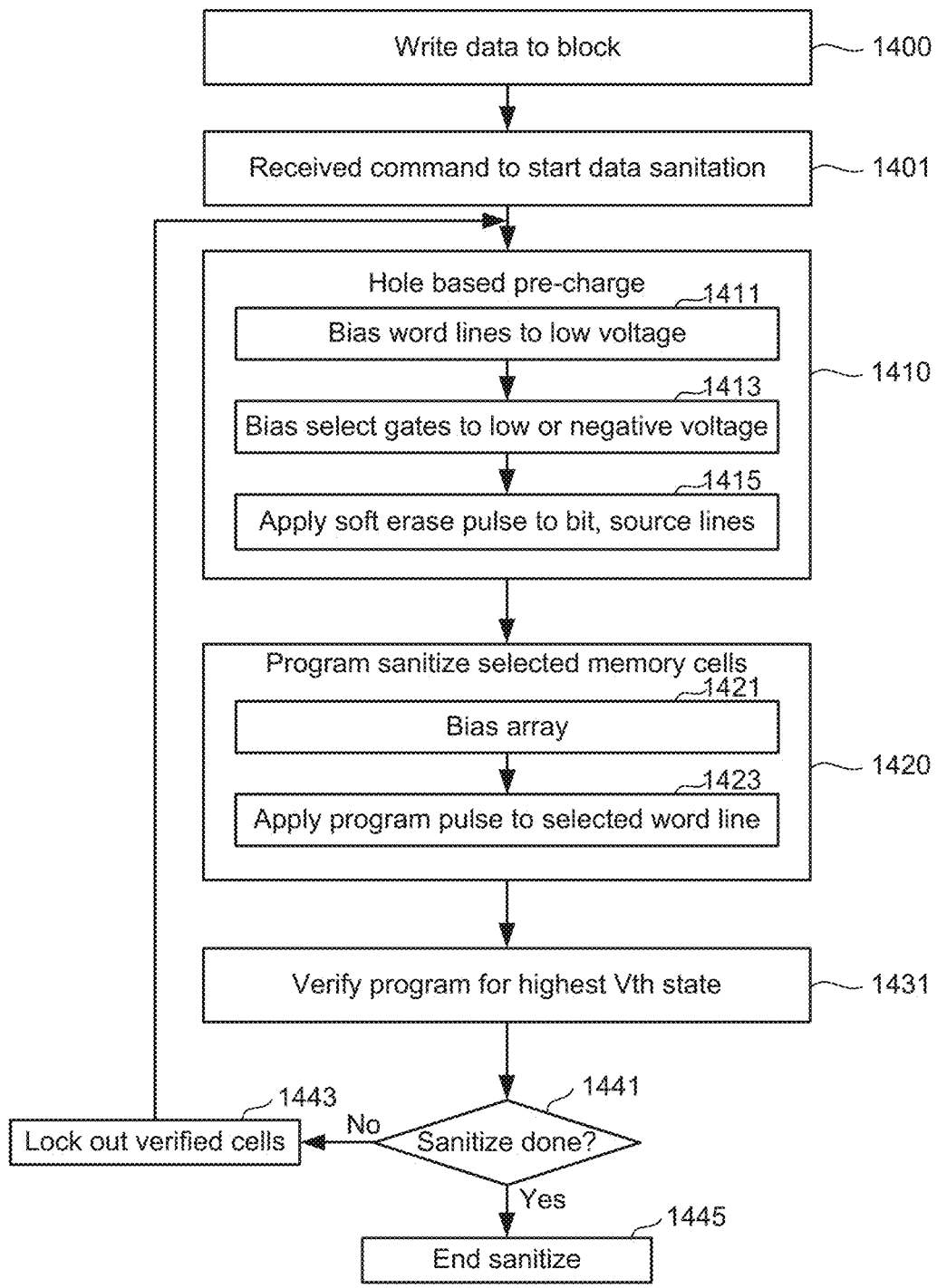
FIG. 14 is a flowchart for an embodiment of data sanitization using a hole-based pre-charge.

FIG. 14 is a flowchart for an embodiment of data sanitization using a hole-based pre-charge. Beginning at step 1400, data is written to part or all of one or more blocks of the memory 126/326 of FIG. 1 or 2B. This can be a standard write of host data by the system control logic circuitry 110/360 by the read/write circuits 128 or row control circuitry 320 and column control circuitry 364, depending on the embodiment. Subsequently, the system control logic circuitry 110/360 receives a command from a host to perform a data sanitation operation of previously written data content. To sanitize the specified data content, the corresponding memory cells are then programmed to be overwritten to the highest data state as described above with respect to FIGS. 8-11 and 13 in a pre-charge/program loop.

The pre-charge/program loop includes a hole based pre-charge 1410, followed by the programming pulse to a selected word line at 1420, followed by a verify 1431. Although not shown in FIG. 14, an initial verify operation can be performed before the first pre-charge/program pulse to lock out memory cells already programmed to the highest threshold voltage state.

As discussed with respect to FIGS. 8, 9, and 13, in the pre-charge phase at step 1411 the word lines of a NAND strings with a memory selected for erase are biased to a low voltage level (e.g., ground or other low voltage). The source and drain side select gates of NAND strings with sanitize selected memory cells are similarly biased to be off by a low or negative voltage at step 1413. While the memory cells and select gates of the NAND strings with sanitize selected memory cells are biased at steps 1411 and 1413, a soft erase pulse is applied to one or both of the source line and bit line of these NAND strings at step 1415, as illustrated between ta and tb of FIG. 13. The NAND strings, source line or lines, and bit lines can be biased by the read/write circuits 128 or row control circuitry 320 and column control circuitry 364 under control of the system control logic circuitry 110/360, depending on the embodiment.

After the hole based pre-charge, a program pulse is applied to raise the threshold voltage of the sanitize selected memory cells along the currently selected word line at 1420. This can be as for a standard programming operation as illustrated between t2 and t3 of FIG. 13, with the array biased at step 1421, including setting unselected word lines to VPASS and biasing the select gates and source lines/bits lines for a program pulse. The programming pulse is then applied at step 1423, where the programming pulses are an increasing staircase waveform as describe with respect to FIG. 11. As before, in steps 1421 and 1423 the NAND strings, source line or lines, and bit lines can be biased by the read/write circuits 128 or row control circuitry 320 and column control circuitry 364 under control of the system control logic circuitry 110/360, depending on the embodiment.

A verify can then follow the program pulse at step 1431, where this can be a standard program verify operation using the read/write circuits 128 or row control circuitry 320 and column control circuitry 364 under control of the system control logic circuitry 110/360, except that as all sanitize selected memory cells are begin programmed to the highest threshold value, only the highest Vth state (e.g., S7 in the 3-bit per cell example) is checked. Depending on the embodiment, this can include a quick pass write implementation in which a low and high verify level are used, with memory cells that verify at the low level are partially inhibited. (Also depending on the embodiment, since data sanitization programs all of the selected memory cells to the highest Vth state, some or all of the verifications may be skipped to increase performance.) At step 1441, the memory cells that verify at the highest Vth level can be locked out at step 1443, with the process then looping back to step 1410. Once all of the sanitize selected memory cells verify the process ends at step 1445. If there are additional sanitize selected memory cells on other word lines or other memory blocks, rather than end at step 1445 the flow repeats for these. As before, for the verify of step 1431 the NAND strings, source line or lines, and bit lines can be biased by the read/write circuits 128 or row control circuitry 320 and column control circuitry 364 under control of the system control logic circuitry 110/360, depending on the embodiment, where the system control logic circuitry 110/360 can also make the determination of step 1441.

In one set of embodiments a non-volatile memory device comprises a control circuit configured to connect to an array of non-volatile memory cells, the array including a first NAND string comprising a plurality of memory cells each connected in series to a corresponding word line, between a first bit line and a source line, and connected to the first bit line through a drain side select gate and to the source line through a source side select gate, the control circuit configured to perform a program operation on a selected memory cell of the first NAND string. To perform the program operation, the control circuit is configured to: apply a programming pulse to the corresponding word line connected to the selected memory cell; and prior to applying the programming pulse to the corresponding word line connected to the selected memory cell, perform a pre-charge operation on the first NAND string. In the pre-charge operation the control circuit is configured to: bias the corresponding word lines of the first NAND string to a low voltage level; bias the drain side select gate and the source side select gate of the first NAND string to be off; and while the corresponding word lines of the first NAND string are biased to the low voltage level and the drain side select gate and the source side select gate of the first NAND string are biased to be off, bias one or both of the first bit line and the source line to a first voltage level for a first interval.

Further embodiments include a method that comprises programming data to memory cells of a block of a NAND memory device, each of the memory cells connected along one of a plurality of word lines and belonging to a corresponding one of a plurality of NAND strings and subsequently performing a data sanitation operation on one or more selected memory cells connected along a first word line of the block, comprising: applying a series of programming pulses to the first word line; and prior to applying each of the programming pulses to the first word line, performing a soft erase operation on the corresponding NAND strings of the selected memory cells.

Additional embodiment present a non-volatile memory device, comprising: a memory die comprising one or more blocks of non-volatile memory cells, the memory cells of each block connected along one of a plurality of word lines and belonging to a corresponding one of a plurality of NAND strings, each of plurality of NAND strings including a corresponding source side select gate and a corresponding drain side select gate, and each of the NAND stings connected between a corresponding bit line and a corresponding one of one or more source line respectively though the corresponding drain side select gate and though the corresponding source side select gate; and one or more control circuits connected to the word lines, source side select gates, drain side select gates, bits lines, and one or more source lines. The one or more control circuits are configured to: program data to the memory cells of a first block of the NAND memory device; and subsequently perform a data sanitation operation on one or more selected memory cells connected along a first word line of the first block. To perform the data sanitation operation, the one or more control circuits are configured to: apply a series of programming pulses to the first word line; and prior to applying each of the programming pulses to the first word line, perform a soft erase operation on the corresponding NAND strings of the selected memory cells.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

What is claimed is:

1. A non-volatile memory device, comprising:
a control circuit configured to connect to an array of non-volatile memory cells, the array including a first NAND string comprising a plurality of memory cells each connected in series to a corresponding word line, between a first bit line and a source line, and connected to the first bit line through a drain side select gate and to the source line through a source side select gate, the control circuit configured to perform a program operation on a selected memory cell of the first NAND string, where, to perform the program operation, the control circuit is configured to:
apply a programming pulse to the corresponding word line connected to the selected memory cell; and
prior to applying the programming pulse to the corresponding word line connected to the selected memory cell, perform a pre-charge operation on the first NAND string in which the control circuit is configured to:
bias the corresponding word lines of the first NAND string to a low voltage level;
bias the drain side select gate and the source side select gate of the first NAND string to be off; and
while the corresponding word lines of the first NAND string are biased to the low voltage level and the drain side select gate and the source side select gate of the first NAND string are biased to be off, bias one or both of the first bit line and the source line to a first voltage level for a first interval.

2. The non-volatile memory device of claim 1, wherein the control circuit is on a control die, the non-volatile memory device further comprising:
a memory die including the array of non-volatile memory cells, the memory die separate from and bonded to the control die.

3. The non-volatile memory device of claim 1, wherein the control circuit is further configured to:
erase the memory cells of the first NAND string by applying an erase voltage to one or both of the first bit line and the source line, the first voltage level being less than the erase voltage.

4. The non-volatile memory device of claim 3, where in the first voltage level is between 7 and 10 volts.

5. The non-volatile memory device of claim 1, wherein each of the memory cells of the array are configured to store a plurality of data states and the programming operation is a data sanitation operation in which the control circuit is configured to concurrently program the selected memory cell of the first NAND string and one or more additional memory cells the data state having a highest threshold voltage.

6. The non-volatile memory device of claim 5, wherein the memory cells of the first NAND string have been programmed previously to the pre-charge operation.

7. The non-volatile memory device of claim 1, wherein, to perform the program operation, the control circuit is further configured to:
subsequent to applying the programming pulse to the corresponding word line connected to the selected memory cell, performing a verify operation on the selected memory cell, perform a program verify; and
in response to the selected memory cell not passing the verify operation, applying a further program pulse to the corresponding word line connected to the selected memory cell subsequent to performing a further pre-charge operation on the first NAND string.

8. The non-volatile memory device of claim 7, wherein each of the memory cells of the array are configured to store a plurality of data states and the program verify only verifies the data state having a highest threshold voltage data state.

9. The non-volatile memory device of claim 1, wherein, to bias the corresponding word lines of the first NAND string to a low voltage level, the control circuit is further configured to bias the corresponding word lines of the first NAND string to ground.

10. The non-volatile memory device of claim 1, wherein, to bias the drain side select gate and the source side select gate of the first NAND string to be off, the control circuit is further configured to bias the drain side select gate and the source side select gate of the first NAND string to ground.

11. The non-volatile memory device of claim 1, wherein, to bias the drain side select gate and the source side select gate of the first NAND string to be off, the control circuit is further configured to bias the drain side select gate and the source side select gate of the first NAND string to a negative voltage.

12. The non-volatile memory device of claim 1, further comprising the array of non-volatile memory cells, wherein the array of non-volatile memory cells has a three-dimensional architecture in which word lines run horizontally relative to a substrate and the memory cells are formed along memory holes running vertically through the word lines.

13. The non-volatile memory device of claim 1, wherein an amplitude of the first voltage level is a settable parameter.

14. The non-volatile memory device of claim 1, wherein a duration of the first interval is a settable parameter.

15. A method, comprising:
programming data to memory cells of a block of a NAND memory device, each of the memory cells connected along one of a plurality of word lines and belonging to a corresponding one of a plurality of NAND strings, each of the plurality of NAND strings includes a corresponding source side select gate and a corresponding drain side select gate, and each of the NAND stings is connected between a corresponding bit line and a corresponding source line respectively though the corresponding drain side select gate and though the corresponding source side select gate; and
subsequently performing a data sanitation operation on one or more selected memory cells connected along a first word line of the block, comprising:
  applying a series of programming pulses to the first word line; and
  prior to applying each of the programming pulses to the first word line, performing a soft erase operation on of the corresponding NAND strings of the selected memory cells comprising:
    biasing the corresponding word lines to a low voltage level;
    biasing the drain side select gate and the source side select gate of the NAND string to be off; and
    while the corresponding word lines of the NAND string are biased to the low voltage level and the drain side select gate and the source side select gate of the NAND string are biased to be off, biasing one or both of the corresponding bit line and the corresponding source line to a first voltage level for a first interval.

16. The method of claim 15, wherein performing the data sanitation operation further comprises:
  subsequent to applying each programming pulse to the first word line, performing a verify operation on the selected memory cells, performing a program verify wherein each of the memory cells are configured to store a plurality of data states and the program verify only verifies the data state having a highest threshold voltage.

17. The method of claim 15, further comprising:
  erasing the memory cells of the NAND strings by applying an erase voltage to one or both of the first bit line and the source line, the first voltage level being less than the erase voltage.

18. A non-volatile memory, comprising:
  a memory die comprising one or more blocks of non-volatile memory cells, the memory cells of each block connected along one of a plurality of word lines and belonging to a corresponding one of a plurality of NAND strings, each of plurality of NAND strings including a corresponding source side select gate and a corresponding drain side select gate, and each of the NAND stings connected between a corresponding bit line and a corresponding one of one or more source line respectively though the corresponding drain side select gate and though the corresponding source side select gate; and
  one or more control circuits connected to the word lines, source side select gates, drain side select gates, bits lines, and one or more source lines, wherein the one or more control circuits are configured to:
    program data to the memory cells of a first block of the NAND memory device; and
    subsequently perform a data sanitation operation on one or more selected memory cells connected along a first word line of the first block, in which the one or more control circuits are configured to:
      apply a series of programming pulses to the first word line; and
      prior to applying each of the programming pulses to the first word line, perform a soft erase operation on the corresponding NAND strings of the selected memory cells, wherein, to perform the soft erase operation on each of the corresponding NAND strings of the selected memory cells, the one or more control circuits are further configured to:
        bias the corresponding word lines to a low voltage level;
        bias the drain side select gate and the source side select gate of the NAND string to be off; and
        while the corresponding word lines of the NAND string are biased to the low voltage level and the drain side select gate and the source side select gate of the NAND string are biased to be off, bias one or both of the corresponding bit line and the corresponding source line to a first voltage level for a first interval.

19. The non-volatile memory device of claim 18, wherein, to perform the data sanitation operation, the one or more control circuits are further configured to:
  subsequent to applying each programming pulse to the first word line, performing a verify operation on the selected memory cells, perform a program verify wherein each of the memory cells are configured to store a plurality of data states and the program verify only verifies the data state having a highest threshold voltage.

20. The non-volatile memory device of claim 18, wherein the one or more control circuits are further configured to:
  erase the memory cells of the NAND strings by applying an erase voltage to one or both of the first bit line and the source line, the first voltage level being less than the erase voltage.

* * * * *